(12) United States Patent
Yoshizawa et al.

(10) Patent No.: US 9,007,671 B2
(45) Date of Patent: Apr. 14, 2015

(54) LIGHT-QUANTITY CONTROL APPARATUS AND OPTICAL APPARATUS

(71) Applicant: Canon Denshi Kabushiki Kaisha, Saitama (JP)

(72) Inventors: Takahito Yoshizawa, Saitama (JP); Kimio Handa, Saitama (JP)

(73) Assignee: Canon Denshi Kabushiki Kaisha, Chichibu-shi (JP)

( * ) Notice: Subject to any disclaimer, the term of this patent is extended or adjusted under 35 U.S.C. 154(b) by 0 days.

(21) Appl. No.: 13/774,548

(22) Filed: Feb. 22, 2013

(65) Prior Publication Data

US 2013/0170009 A1 Jul. 4, 2013

Related U.S. Application Data

(63) Continuation of application No. PCT/JP2011/004649, filed on Aug. 22, 2011.

(30) Foreign Application Priority Data

Aug. 23, 2010 (JP) ................................. 2010-185865
Oct. 29, 2010 (JP) ................................. 2010-243418

(51) Int. Cl.
  *G02B 26/12* (2006.01)
  *G03B 7/085* (2006.01)
  *G03B 9/06* (2006.01)

(52) U.S. Cl.
  CPC . *G03B 7/085* (2013.01); *G03B 9/06* (2013.01)

(58) Field of Classification Search
  CPC ....... G09F 9/372; G02B 26/002; G02B 5/005
  USPC .......... 359/227, 230–234; 396/235, 246, 355, 396/357, 449, 452–453, 461, 483–490, 493, 396/498
  See application file for complete search history.

(56) References Cited

U.S. PATENT DOCUMENTS 7,878,721 B2 2/2011 Azuma et al.
8,038,357 B2 10/2011 Horidan et al.
(Continued)

FOREIGN PATENT DOCUMENTS

| JP | 2-48928 U | 4/1990 |
| JP | 4-119434 U | 10/1992 |
| JP | 2009-115831 A | 5/2009 |
| JP | 2010-145708 A | 7/2010 |

OTHER PUBLICATIONS

International Search Report issued in PCT/JP2011/004649, dated Sep. 13, 2011.

(Continued)

*Primary Examiner* — Jennifer L. Doak
(74) *Attorney, Agent, or Firm* — Fitzpatrick, Cella, Harper & Scinto

(57) ABSTRACT

The light-quantity control apparatus includes a base member having an opening allowing light to pass therethrough, a first aperture blade movable in a direction orthogonal to a light passing direction, a second aperture blade rotatable in a surface orthogonal to the light passing direction, and a driving lever to be rotated by a driver to drive the first and second aperture blades. The base member has a protruding portion engaging with a groove portion provided in the first aperture blade, the second aperture blade has a driving cam groove portion with which a driving pin provided in the driving lever slidably engages and a rotation center hole portion with which the protruding portion engages. The second aperture blade is rotated about the protruding portion by sliding of the driving pin with respect to the driving cam groove portion with rotation of the driving lever.

14 Claims, 17 Drawing Sheets

(56) References Cited

U.S. PATENT DOCUMENTS

| | | |
|---|---|---|
| 2005/0226611 A1 | 10/2005 | Kawaguchi |
| 2009/0116832 A1 | 5/2009 | Azuma et al. |
| 2009/0147340 A1* | 6/2009 | Lipton et al. ............... 359/230 |
| 2010/0158505 A1* | 6/2010 | Horidan et al. ............. 396/508 |
| 2010/0158507 A1 | 6/2010 | Hattori et al. |
| 2013/0170009 A1* | 7/2013 | Yoshizawa et al. ......... 359/230 |

OTHER PUBLICATIONS

European Search Report issued in European Patent Application No. 11819580.9, dated Oct. 24, 2014.

Jan. 7, 2015 Chinese Official Action in Chinese Patent Appln. No. 201180041188.9.

\* cited by examiner

LIGHT-QUANTITY CONTROL APPARATUS AND OPTICAL APPARATUS

CROSS-REFERENCE TO RELATED APPLICATIONS

This application is a continuation of International Patent Appln. No. PCT/JP2011/004649, filed on Aug. 22, 2011 which is hereby incorporated by reference herein in its entirety as if fully set forth herein.

BACKGROUND OF THE INVENTION

1. Field of the Invention

The present invention relates to a light-quantity control apparatus, also called an aperture stop apparatus, which is used in optical apparatuses such as cameras and interchangeable lenses.

2. Description of the Related Art

Performance of such a light-quantity control apparatus (aperture stop apparatus) influences the quality of images captured by using optical apparatuses, and, particularly, the shape of an aperture (aperture shape) formed by aperture blades and through which light actually passes changes the shape of so-called blur and ghost. Specifically, an aperture shape close to a circular shape makes the shape of the blur and ghost circular, which provides natural images, but a rectangular or flat aperture shape significantly different from the circular aperture shape makes the shape of the blur and ghost rectangular or flat, which provides unnatural images. Such an aperture shape significantly different from the circular shape is likely to be formed when the aperture is formed by two aperture blades. Thus, Japanese Utility Model Laid-Open No. 02-048928 discloses an iris aperture stop apparatus that rotates a driving ring around an aperture to rotate multiple aperture blades and forms a polygonal aperture shape closer to a circular shape than to a rectangular shape. Moreover, Japanese Patent Laid-Open No. 2009-115831 discloses an aperture stop apparatus that forms a polygonal aperture shape closer to a circular shape than to a rectangular shape by a combination of paired linearly-slidable aperture blades and paired swingable (rotatable) aperture blades.

SUMMARY OF THE INVENTION

However, the configuration of the iris aperture stop apparatus disclosed in Japanese Utility Model Laid-Open No. 02-048928 is likely to increase the circumferential size of the apparatus because the driving ring is disposed around the aperture and the multiple aperture blades need a space for retraction in an entire circumferential part of the apparatus.

On the other hand, the aperture stop apparatus disclosed in Japanese Patent Laid-Open No. 2009-115831 can decrease the size of the apparatus in a width direction orthogonal to a movable direction of the paired linearly-movable aperture blades, as compared with the iris aperture stop apparatus disclosed in Japanese Utility Model Laid-Open No. 02-048928. However, since the aperture stop apparatus disclosed in Japanese Patent Laid-Open No. 2009-115831 has a configuration that moves the paired linearly-movable aperture blades and rotates the paired swingable aperture blades by a ring plate being rotated around the aperture, which is similar to the iris aperture stop apparatus, it is difficult to sufficiently decrease the size of the aperture stop apparatus.

The present invention provides a compact light-quantity control apparatus capable of forming a good aperture shape, and provides an optical apparatus using the light-quantity control apparatus.

The present invention provides as a first aspect thereof a light-quantity control apparatus including a base member provided with an opening allowing light to pass therethrough in a light passing direction, a first aperture blade movable with respect to the base member in a direction orthogonal to the light passing direction so as to increase and decrease its part overlapping the opening, a second aperture blade rotatable with respect to the base member in a surface orthogonal to the light passing direction so as to increase and decrease its part overlapping the opening, a driver attached to the base member; and a driving lever to be rotated by the driver to drive the first and second aperture blades. The base member is provided with a protruding portion engaging with a groove portion provided in the first aperture blade to guide the first aperture blade in its movable direction. The second aperture blade is provided with a driving cam groove portion with which a driving pin provided in the driving lever slidably engages and a rotation center hole portion with which the protruding portion engages. The second aperture blade is rotated about the protruding portion in the surface orthogonal to the light passing direction by sliding of the driving pin with respect to the driving cam groove portion with rotation of the driving lever.

The present invention provides as a second aspect thereof a light-quantity control apparatus including a base member provided with an opening allowing light to pass therethrough in a light passing direction, a first aperture blade movable with respect to the base member in a direction orthogonal to the light passing direction so as to increase and decrease its part overlapping the opening, a second aperture blade rotatable with respect to the base member in a surface orthogonal to the light passing direction so as to increase and decrease its part overlapping the opening, a driver attached to the base member, and a driving lever to be rotated by the driver about an axis to drive the first and second aperture blades, the axis being located away in the direction orthogonal to the light passing direction from the opening. The first aperture blade engages with a driving pin provided in the driving lever and receives driving force from the driving pin. The second aperture blade is provided with a driving cam groove portion with which the driving pin engaging with the first aperture blade slidably engages and a rotation center hole portion with which a protruding portion provided in the base member engages. The second aperture blade is rotated about the protruding portion in the surface orthogonal to the light passing direction by sliding of the driving pin with respect to the driving cam groove portion with rotation of the driving lever.

The present invention provides as a third aspect thereof a light-quantity control apparatus including a base member provided with an opening allowing light to pass therethrough in a light passing direction, a driver attached to the base member, a driving lever to be rotated by the driver about an axis located away in the direction orthogonal to the light passing direction from the opening, and a first aperture blade and a second aperture blade each engaging with a driving pin provided in the driving lever to be moved by the driving lever so as to increase and decrease its part overlapping the opening. The first aperture blade is provided with a first engaging portion rotatably engaging with the driving pin and a second engaging portion slidably engaging with a guiding portion provided in the base member, and the second aperture blade is provided with a driving cam groove portion slidably engaging with the driving pin and a rotation center hole portion rotatably engaging with a protruding portion provided in the base member. The first aperture blade is moved in the direction orthogonal to the light passing direction and rotated in a surface orthogonal to the light passing direction about the driving pin with which the first engaging portion engages.

The second aperture blade is rotated about the protruding portion with which the rotation center hole portion engages, in the surface orthogonal to the light passing direction.

The present invention provides as a fourth aspect thereof an optical apparatus including a body of the apparatus, and the above-described light-quantity control apparatus which is housed in the body.

Other aspects of the present invention will become apparent from the following description and the attached drawings.

DESCRIPTION OF THE EMBODIMENTS

Embodiments of the present invention will hereinafter be described with reference to the accompanying drawings.

Embodiment 1

Figure 1:
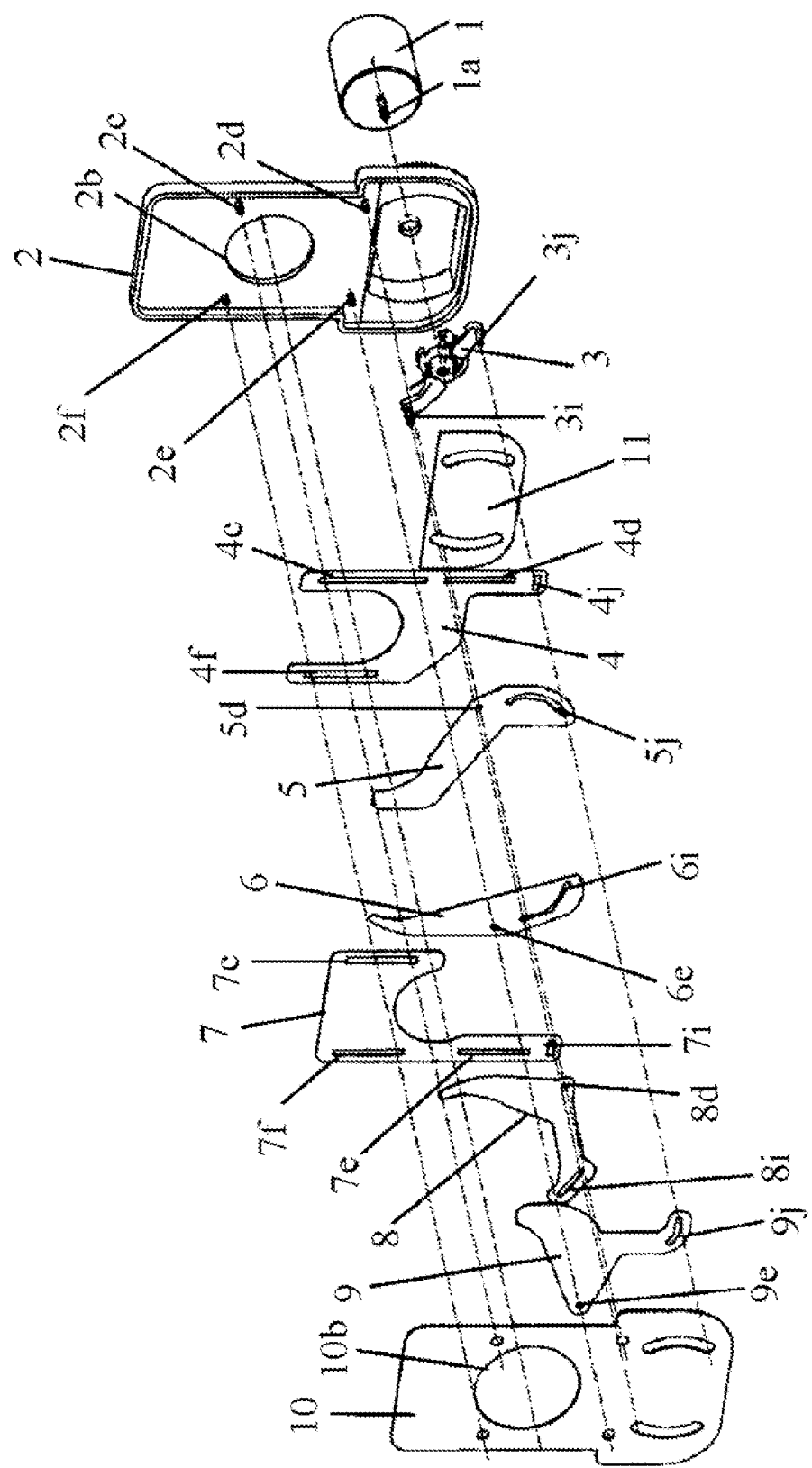
FIG. 1 is an exploded perspective view of an aperture stop apparatus that is Embodiment 1 of the present invention.
Figure 2:
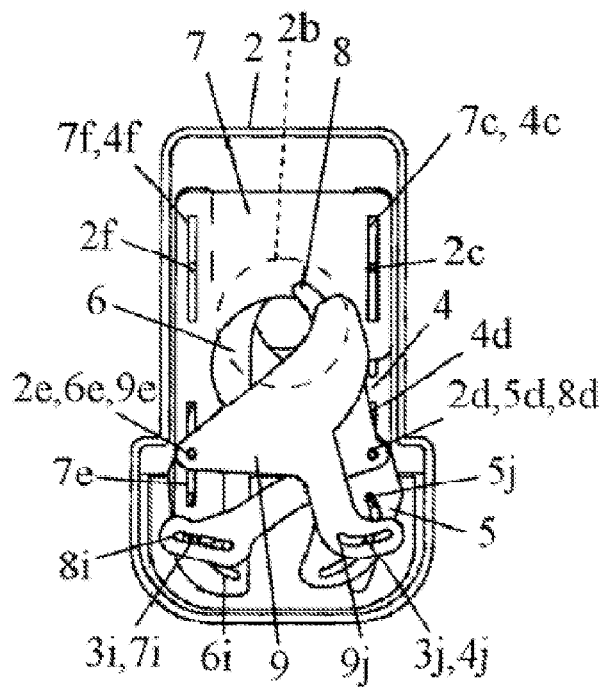
FIG. 2 is a front view of the aperture stop apparatus of Embodiment 1.
Figure 3:
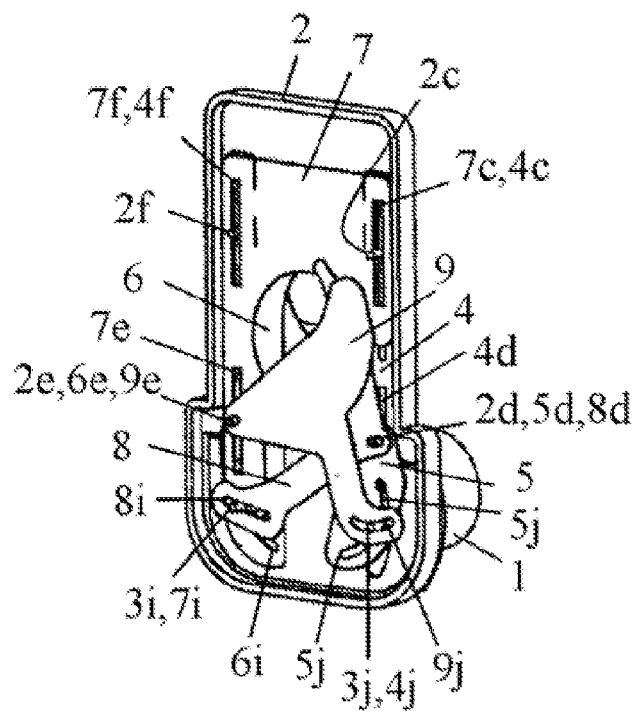
FIG. 3 is a perspective view of the aperture stop apparatus of Embodiment 1.

FIG. 1 shows a configuration of an aperture stop apparatus as a light-quantity control apparatus that is a first embodiment (Embodiment 1) according to the first and second aspects of the present invention. FIG. 2 shows the aperture stop apparatus viewed from a light passing direction (hereinafter referred to also as "an optical axis direction") in which light passes through an aperture formed by aperture blades 4 to 9. In FIG. 2, a cover plate 10 shown in FIG. 1 is omitted. FIG. 3 shows the aperture stop apparatus viewed obliquely. In these figures, an up-down direction, which is a longitudinal direction of the aperture stop apparatus, corresponds to "a direction orthogonal to the light passing direction" and is hereinafter referred to as "an orthogonal-to-optical-axis direction". Moreover, in these figures, a right-left direction of the aperture stop apparatus is hereinafter referred to as "a width direction".

In FIGS. 1 to 3, a base plate 2 as a base member is provided with a fixed opening 2b allowing light to pass therethrough. The base plate 2 is produced by press working, resin molding or the like.

At a position away downward from the fixed opening 2b of an outer face (that is, a face on one side in the optical axis direction) of the base plate 2, an aperture stop driver 1 is attached. The aperture stop driver 1 is, for example, an electromagnetic motor constituted by a rotor magnet (not shown), an output shaft 1a rotatable integrally with the rotor magnet and a coil (not shown) to be energized to generate magnetic force for rotating the rotor magnet. The aperture stop driver 1 may be constituted by a stepping motor.

The output shaft 1a of the aperture stop driver 1 extends so as to penetrate the base plate 2 and protrude on an inner face side of the base plate 2. At a tip of the output shaft 1a, a driving arm 3 as a driving lever is attached by press fitting. The driving arm 3 is rotatable together with the output shaft 1a about an axis located away downward from the fixed opening 2b within a predetermined angle range. The driving arm 3 is produced by resin molding or the like. The output shaft 1a and the driving arm 3 may be formed integrally.

The driving arm 3 is provided with, at its both ends across its portion attached to the output shaft 1a, blade driving pins 3i and 3j as transmitting portions to drive aperture blades 4 to 9. The blade driving pins 3i engage with three aperture blades: a rotatable aperture blade 6, a linearly-movable aperture blade 7 and a rotatable aperture blade 8. On the other hand, the blade driving pins 3j engages with other three aperture blades: a linearly-movable aperture blade 4, a rotatable aperture blade 5 and a rotatable aperture blade 9.

A configuration may be employed in which the aperture stop driver 1 and the driving arm 3 are disposed on an outer face side of the base plate 2 and the blade driving pins 3i and 3j extend so as to penetrate the base plate 2 and protrude on the inner face side of the base plate 2.

As described above, the aperture stop apparatus of this embodiment provides the two blade driving pins 3i and 3j to the single driving arm 3 directly attached to (or formed integrally with) the output shaft 1a of the aperture stop driver 1, and engages the one linearly-movable aperture blade 7 as one of two first aperture blades and the two rotatable aperture blades 6 and 8 as two of four second aperture blades with the same (common) driving pin 3i. Moreover, the aperture stop apparatus of this embodiment engages the one linearly-movable aperture blade 4 as another one of the two first aperture blades and the two rotatable aperture blades 5 and 9 as other two of the four second aperture blades with the same (common) driving pin 3j. In such a configuration, the aperture stop apparatus of this embodiment rotates the driving arm 3, each of whose blade driving pins 3i and 3j engages with the three aperture blades to move the two linearly-movable aperture blades 4 and 7 in the orthogonal-to-optical-axis direction and to rotate the rotatable aperture blades 5, 6, 8 and 9 in the surface orthogonal to the optical axis direction (hereinafter referred to as "an orthogonal-to-optical-axis surface") so as to increase and decrease their parts overlapping the fixed opening. The six aperture blades 4 to 9 thus moved or rotated can form a polygonal aperture having a shape close to a circular shape and change size (that is, diameter) of the aperture.

The above-described configuration is advantageous for miniaturization of the aperture stop apparatus while enabling formation of an aperture having a good shape as compared with the conventional configuration disclosed in Japanese Patent Laid-Open No. 2009-115831 which rotates the driving ring around the aperture and drives the linearly-movable aperture blades and the rotatable aperture blades by mutually separate transmitting portions.

In this embodiment, the movement of the linearly-movable aperture blades 4 and 7 in the orthogonal-to-optical-axis direction means not only linear movement (translation) thereof in the orthogonal-to-optical-axis, but also movement thereof in the orthogonal-to-optical-axis with being swung or shifted in the width direction.

An arm cover 11 is disposed between the driving arm 3 and the aperture blade 4 (to 9) to prevent unnecessary contact (interference) therewith. The arm cover 11 is produced by press working, resin molding or the like. The arm cover 11 can be omitted when the driving arm 3 and the aperture blade 4 are disposed with a sufficient clearance gap therebetween.

A cover plate 10 is attached to the base plate 2 so as to form with the base plate 2 a space where the aperture blades 4 to 9 can be moved. The cover plate 10 is provided with an opening 10*b* corresponding to the fixed opening 2*b* formed in the base plate 2. The cover plate 10 is produced by press working, resin molding or the like. The cover plate 10 is further provided with rails (not shown) on its inner face (base member side face) to reduce slide resistance with the aperture blades 4 to 9.

The aperture stop apparatus of this embodiment can, as described above, change the aperture diameter by rotating the driving arm 3 and completely close (close off) the aperture. Therefore, this aperture stop apparatus of this embodiment can perform a shutter operation, which enables use of the aperture stop apparatus as an aperture stop and shutter apparatus.

The linearly-movable aperture blade 4 slidably engages, at a driving elongated hole portion 4*j* formed in its lower end part, with the blade driving pin 3*j* of the driving arm 3. Moreover, boss portions (or pin portions) 2*c* and 2*d*, as protruding portions, provided in the base plate 2, slidably engage respectively with guiding elongated hole portions (or guiding groove portions) 4*c* and 4*d* formed in the linearly-movable aperture blade 4 so as to extend in the orthogonal-to-optical-axis direction. An elongated hole portion 4*f* is formed as a clearance groove portion for avoiding interference with a boss portion 2*f* provided in the base plate 2.

Figure 4:
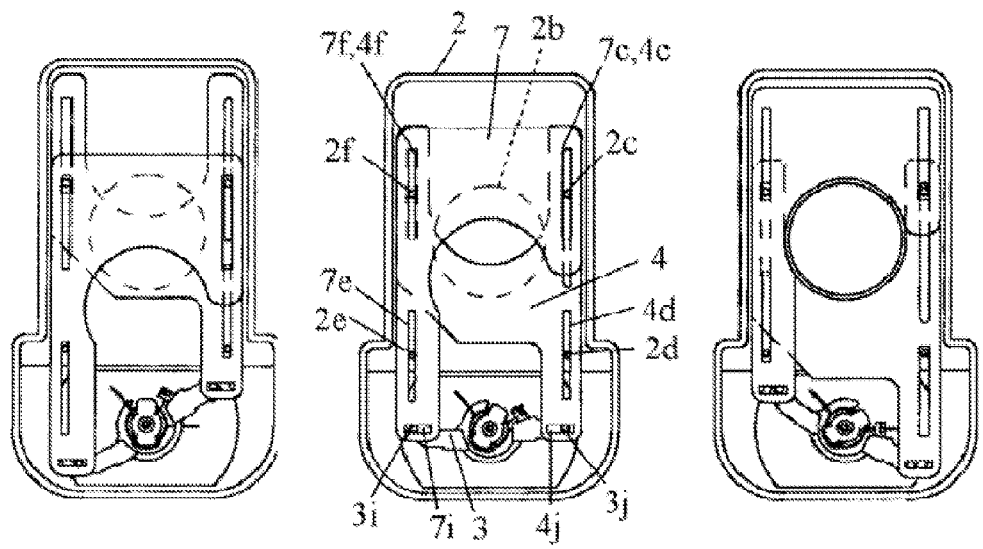
FIG. 4 is a front view of linearly-movable aperture blades used in the aperture stop apparatus of Embodiment 1.

As shown in FIG. 4, the driving arm 3 rotating within the above-mentioned predetermined angle range transmits a driving force from the blade driving pin 3*j* to the driving elongated hole portion 4*j* of the linearly-movable aperture blade 4, thereby moving the linearly-movable aperture blade 4 in the orthogonal-to-optical-axis direction with guiding of the guiding elongated hole portions 4*c* and 4*d* by the boss portions 2*c* and 2*d*.

The linearly-movable aperture blade 7 slidably engages, at a driving elongated hole portion 7*i* formed in its lower end part, with the blade driving pin 3*i* of the driving arm 3. Moreover, the above-mentioned boss portion 2*f* of the base plate 2 and a boss portion (or a pin portion) 2*e* as a protruding portion also provided in the base plate 2 slidably engages respectively with guiding elongated hole portions (or guiding groove portions) 7*f* and 7*e* formed in the linearly-movable aperture blade 7 so as to extend in the orthogonal-to-optical-axis direction. An elongated hole portion 7*c* is formed as a clearance groove portion for avoiding interference with the boss portion 2*c* provided in the base plate 2.

As shown in FIG. 4, the driving arm 3 rotating within the above-mentioned predetermined angle range transmits a driving force from the blade driving pin 3*i* to the driving elongated hole portion 7*i* of the linearly-movable aperture blade 7, thereby moving the linearly-movable aperture blade 7 in the orthogonal-to-optical-axis direction with guiding of the guiding elongated hole portions 7*e* and 7*f* by the boss portions 2*e* and 2*f*.

On the other hand, the rotatable aperture blade 5 slidably engages, at a driving cam groove portion 5*j* formed in its lower part, with the blade driving pin 3*j* of the driving arm 3. Moreover, the boss portion 2*d* as a rotation center (or a rotation center boss portion) provided in the base plate 2 rotatably engages with a rotation center hole portion 5*d* formed in the rotatable aperture blade 5. That is, the boss portion 2*d* has not only a function of guiding the linearly-movable aperture blade 4 in its movable direction by the slidable engagement with the guiding elongated hole portion 4*d* as described above, but also a function of providing the rotation center of the rotatable aperture blade 5 by the rotatable engagement with the rotation center hole portion 5*d*.

Furthermore, the rotatable aperture blade 6 slidably engages, at a driving cam groove portion 6*i* formed in its lower part, with the blade driving pin 3*i* of the driving arm 3. Moreover, the boss portion 2*e* as a rotation center (or a rotation center boss portion) provided in the base plate 2 rotatably engages with a rotation center hole portion 6*e* formed in the rotatable aperture blade 6. That is, the boss portion 2*e* has not only a function of guiding the linearly-movable aperture blade 7 in its movable direction by the slidable engagement with the guiding elongated hole portion 7*e* as described above, but also a function of providing the rotation center of the rotatable aperture blade 6 by the rotatable engagement with the rotation center hole portion 6*e*.

Figure 5:
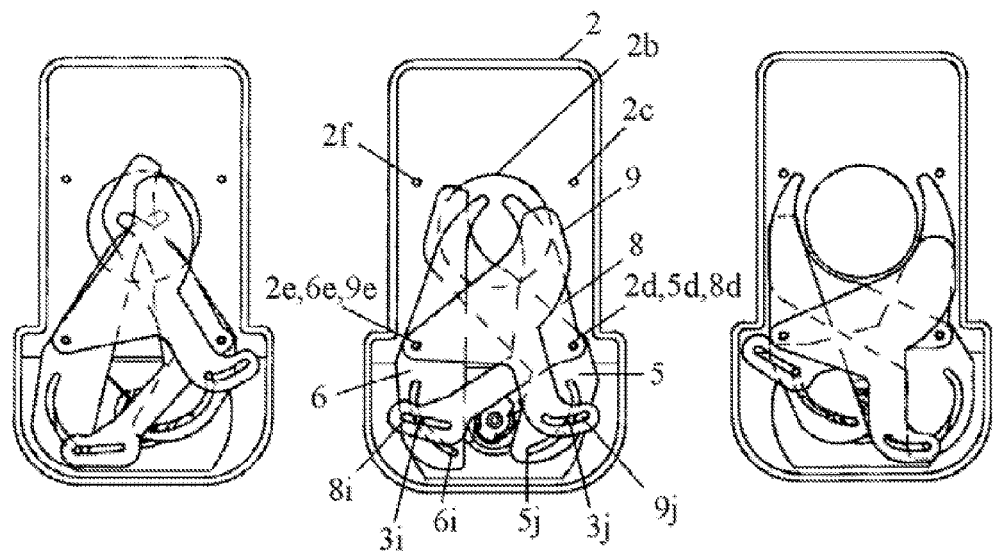
FIG. 5 is a front view of rotatable aperture blades used in the aperture stop apparatus of Embodiment 1.

As shown in FIG. 5, the driving arm 3 rotating within the above-mentioned predetermined angle range transmits a driving force respectively from the blade driving pins 3*j* and 3*i* to the driving cam groove portions 5*j* and 6*i* of the rotatable aperture blades 5 and 6, thereby rotating the rotatable aperture blades 5 and 6 (pivoted) in the orthogonal-to-optical-axis surface about the boss portions 2*d* and 2*e* with which the rotation center hole portions 5*d* and 6*e* engage. The speed of the rotation of the rotatable aperture blades 5 and 6 can be controlled by setting the shape of the driving cam groove portions 5*j* and 6*i*.

Moreover, the rotatable aperture blades 8 and 9 slidably engage respectively, at driving cam groove portions 8*i* and 9*j* formed in their lower parts, with the blade driving pins 3*i* and 3*j* of the driving arm 3. The boss portions 2*d* and 2*e* as rotation centers (or rotation center boss portions) provided in the base plate 2 rotatably engage respectively with rotation center hole portions 8*d* and 9*e* formed in the rotatable aperture blades 8 and 9. That is, the boss portions 2*d* and 2*e* have not only a function of guiding the linearly-movable aperture blades 4 and 7 in their movable direction by the slidable engagement with the guiding elongated hole portions 4*d* and 7*e* as described above, but also a function of providing the rotation centers of the rotatable aperture blades 8 and 9 by the rotatable engagement with the rotation center hole portions 8*d* and 9*e*.

As shown in FIG. 5, the driving arm 3 rotating within the above-mentioned predetermined angle range transmits a driving force respectively from the blade driving pins 3i and 3j to the driving cam groove portions 8i and 9j of the rotatable aperture blades 8 and 9, thereby rotating the rotatable aperture blades 8 and 9 (pivoted) in the orthogonal-to-optical-axis surface about the boss portions 2d and 2e with which the rotation center hole portions 8d and 9e engage. The speed of the rotation of the rotatable aperture blades 8 and 9 can be controlled by setting the shape of the driving cam groove portions 8i and 9j.

Figure 6:
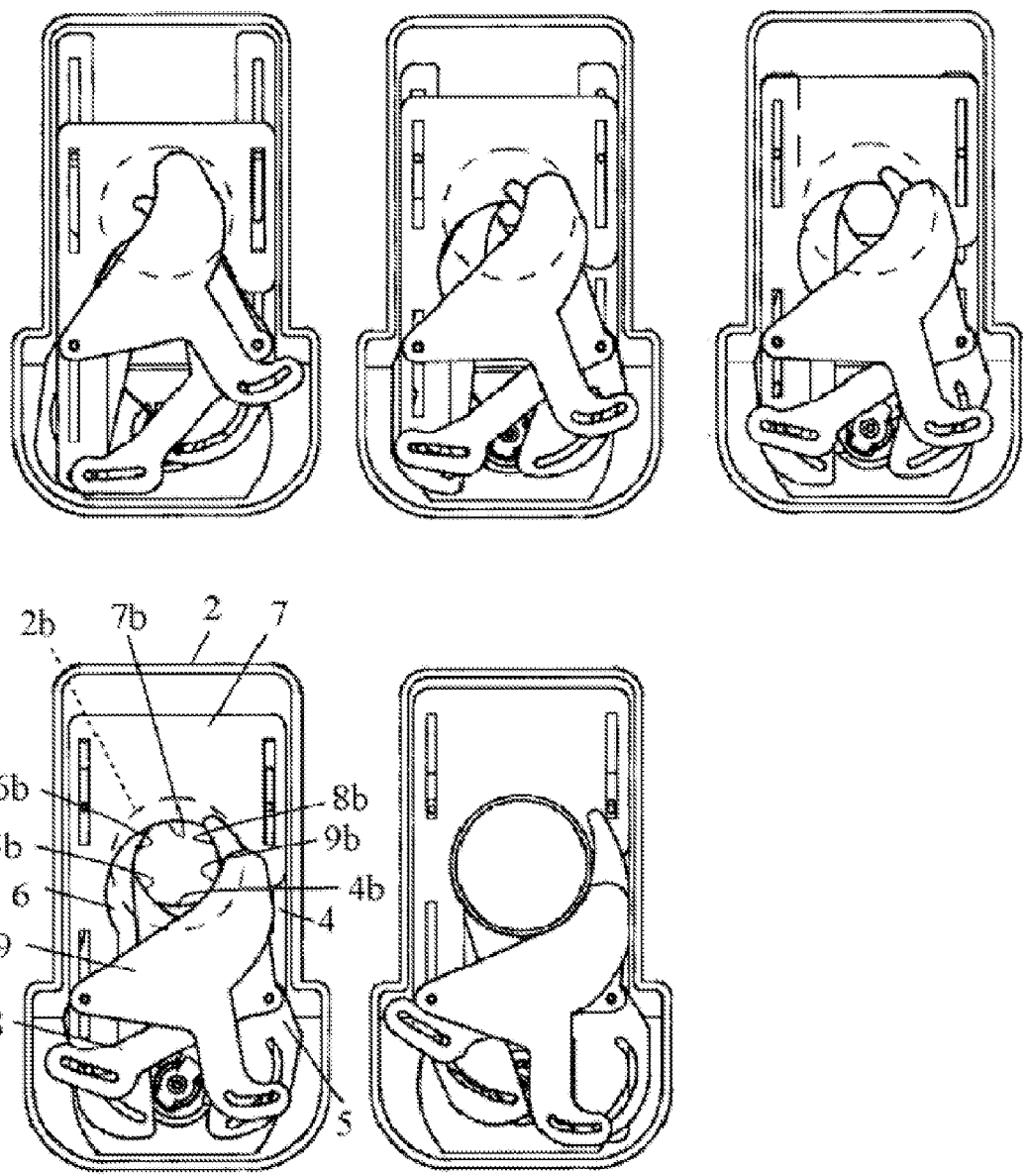
FIG. 6 is a front view showing various aperture shapes formed in the aperture stop apparatus of Embodiment 1.

The rotational position of the rotatable aperture blades 5, 6, 8 and 9 with respect to rotational position of the driving arm 3, that is, the shape of the aperture (aperture shape) can be arbitrarily set by adjusting the shape of the driving cam groove portions 5j, 6i, 8i and 9j formed in the respective rotatable aperture blades 5, 6, 8 and 9. Such setting makes it possible that the aperture stop apparatus of this embodiment provides, in respective aperture states from a fully-opened aperture state shown in a lower right part of FIG. 6 to a small aperture state shown in an upper central part of FIG. 6, apertures formed by aperture forming edges 4b, 5b, 6b, 7b, 8b and 9b of the aperture blades 4, 5, 6, 7, 8 and 9 and having a circular shape (in the fully-opened aperture state) or an approximate regular hexagonal shapes close to the circular shape (in the other aperture states than the fully-opened aperture state). Moreover, the aperture stop apparatus of this embodiment can close off the aperture as shown in an upper left part of FIG. 6, as mentioned above.

As described above, the aperture stop apparatus of this embodiment rotates the single driving arm 3 to move the linearly-movable aperture blades 4 and 7 and rotate the rotatable aperture blades 5, 6, 8 and 9, without using a member such as a driving ring to be rotated around the aperture. This configuration enables miniaturization of the aperture stop apparatus in its longitudinal direction (orthogonal-to-optical-axis direction) and its width direction, and enables reduction in thickness of the aperture stop apparatus in the optical axis direction.

Moreover, using the boss portions 2d and 2e not only for guiding the linearly-movable aperture blades 4 and 7, but also for providing the rotation center of the rotatable aperture blades 5, 6, 8 and 9, enables a reduction of the number of boss portions to be formed in the base plate 2. The reduction of the number of boss portions eliminates the necessity to provide in each aperture blade a clearance shape for avoiding interference with the boss portion, which enables miniaturization of each aperture blade by simplification of the shape of each aperture blade and an increase of the degrees of freedom thereof, and therefore enables further miniaturization of the aperture stop apparatus.

In addition, in the aperture stop apparatus of this embodiment, the boss portions 2d and 2e and the blade driving pins 3i and 3j (that is, the driving lever 3) are collectively disposed on one side (lower side in each figure) with respect to the fixed opening 2b (or the aperture) in the movable direction of the linearly-movable aperture blades 4 and 7. This disposition enables simplification of the shape and the configuration of the base plate 2 on another side (upper side in each figure) with respect to the fixed opening 2b, which enables miniaturization of, particularly, an upper part of the aperture stop apparatus.

Embodiment 2

Figure 7:
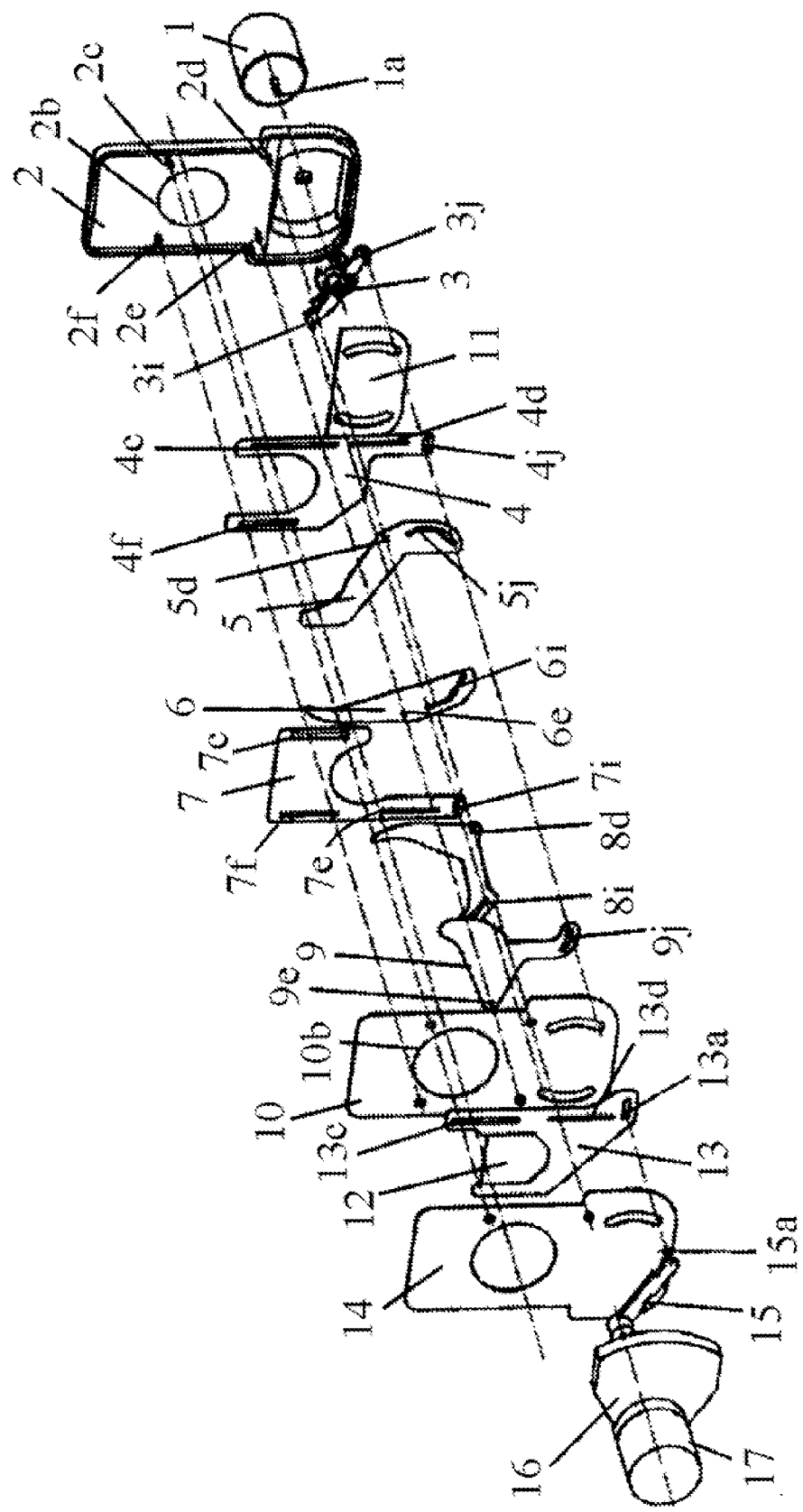
FIG. 7 is an exploded perspective view of an aperture stop apparatus that is Embodiment 2 of the present invention.

FIG. 7 shows a configuration of an aperture stop apparatus as a light-quantity control apparatus that is a second embodiment (Embodiment 2) according to the first and second aspects of the present invention. The aperture stop apparatus of this embodiment is provided with, in addition to the aperture blades 4 to 9 described in Embodiment 1 (FIG. 1), an ND (neutral density) filter 12 capable of reducing the quantity of light passing through the aperture and movable so as to cover the aperture and retract therefrom. In FIG. 7, components identical or similar to those shown in FIG. 1 are denoted by same reference numerals as those in FIG. 1, and their description is omitted.

An ND holding plate 13 holds the ND filter 12. The ND holding plate 13 is disposed on a side opposite to the aperture blades 4 to 9 across the cover plate 10. An outer cover plate 14 is attached to the base plate 2 to form with the base plate 10 a space where the ND holding plate 13 is movable.

A sub base plate 16 to which an ND driver 17 is fixed is attached to the outer cover plate 14. The ND driver 17 is, for example, an electromagnetic motor constituted by a rotor magnet (not shown), an output shaft (not shown) rotatable integrally with the rotor magnet and a coil (not shown) to be energized to generate a magnetic force for rotating the rotor magnet. The ND driver 17 may be constituted by a stepping motor.

An ND arm 15 is attached to the output shaft of the ND driver 17 by press fitting (or formed integrally therewith), and has, at its end, a driving pin 15a. The driving pin 15a extends so as to penetrate the outer cover plate 14 and engages with a driving elongated hole portion 13a formed in a lower end part of the ND holding plate 13. The ND holding plate 13 is further provided with guiding elongated hole portions 13c and 13d formed so at to extend in the orthogonal-to-optical-axis direction. The boss portions 2c and 2d of the base plate 2 slidably engage respectively with the guiding elongated hole portions 13c and 13d.

The ND arm 15 rotated by the ND driver 17 transmits a driving force from the driving pin 15a to the driving elongated hole portion 13a of the ND holding plate 13, thereby moving the ND holding plate 13 in the orthogonal-to-optical-axis direction with guiding of the guiding elongated hole portions 13c and 13d by the boss portions 2c and 2d. As a result, the ND filter 12 is moved so as to cover the aperture and retract therefrom.

A configuration may be employed in which the ND holding plate 13 is moved in the orthogonal-to-optical-axis direction with being swung in the width direction, as well as the linearly-movable aperture blades 4 and 7.

Thus, the configuration described in Embodiment 1 can be applied also to the aperture stop apparatus provided with the ND filter 12. Covering the aperture by the ND filter 12 can reduce the light-quantity without narrowing the aperture to a very small size, which can avoid deterioration of image quality due to so-called small aperture diffraction. Moreover, ghost and blur formed by the aperture stop apparatus of this embodiment also have a shape close to a circular shape, which makes it possible to provide more natural image quality.

Embodiment 3

Figure 8:
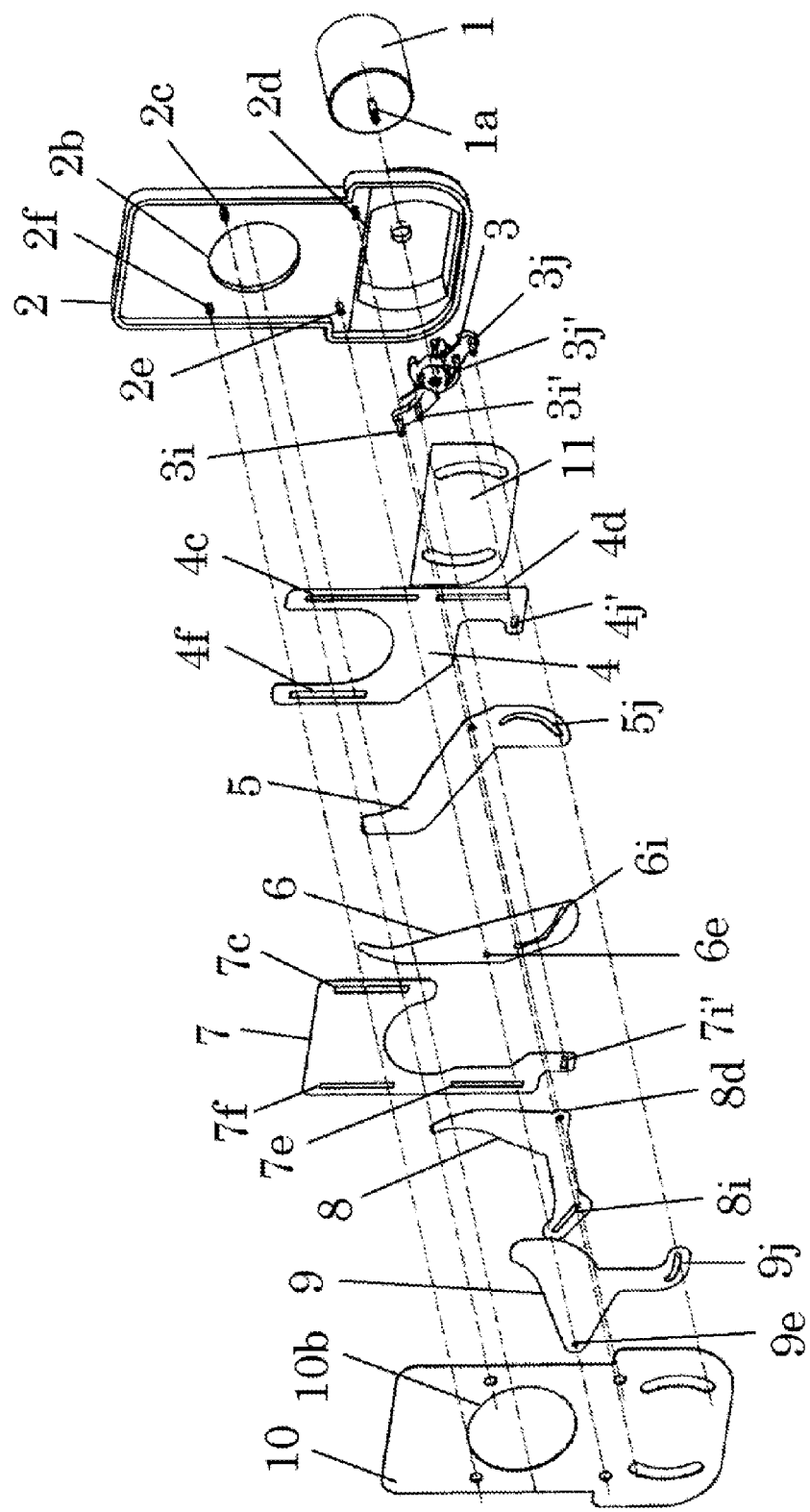
FIG. 8 is an exploded perspective view of an aperture stop apparatus that is Embodiment 3 of the present invention.

FIG. 8 shows a configuration of an aperture stop apparatus as a light-quantity control apparatus that is a third embodiment (Embodiment 3) according to the first aspect of the present invention.

The aperture stop apparatus of this embodiment has a same basic configuration as that of Embodiment 1. Components identical or similar to those in Embodiment 1 are denoted by same reference numerals as those in Embodiment 1, and their description is omitted. Embodiment 1 described the case where the same blade driving pin 3i of the driving arm 3 engages with the one linearly-movable aperture blade 7 and the two rotatable aperture blades 6 and 8 and where the other same blade driving pin 3*j* engages with the one linearly-movable aperture blade 4 and the two rotatable aperture blades 5 and 9. On the other hand, in this embodiment, the driving arm 3 is provided with first blade driving pins 3*i*' and 3*j*' and second blade driving pins 3*i* and 3*j*.

The first blade driving pin 3*i*' slidably engages with a driving elongated hole portion 7*i*' formed at a position shifted inward in the width direction as compared with Embodiment 1 in the lower end part of the linearly-movable aperture blade 7, and the second blade driving pin 3*i* slidably engages with the driving cam groove portions 6*i* and 8*i* of the rotatable aperture blades 6 and 8. Moreover, the first blade driving pin 3*j*' slidably engages with a driving elongated hole portion 4*i*' formed at a position shifted inward in the width direction as compared with Embodiment 1 in the lower end part of the linearly-movable aperture blade 4, and the second blade driving pin 3*j* slidably engages with the driving cam groove portions 5*i* and 9*j* of the rotatable aperture blades 5 and 9.

Also in this embodiment, the aperture stop apparatus rotates the driving arm 3 to move the two linearly-movable aperture blades 4 and 7 in the orthogonal-to-optical-axis direction and to rotate the four rotatable aperture blades 5, 6, 8 and 9 in the orthogonal-to-optical-axis surface so as to increase and decrease their parts overlapping the fixed opening. The six aperture blades 4 to 9 thus moved or rotated can form a polygonal aperture having a shape close to a circular shape and change size (diameter) of the aperture.

In this embodiment, an ND filter may be provided so as to cover the aperture and retract therefrom, as well as in Embodiment 2.

Embodiment 4

Figure 9:
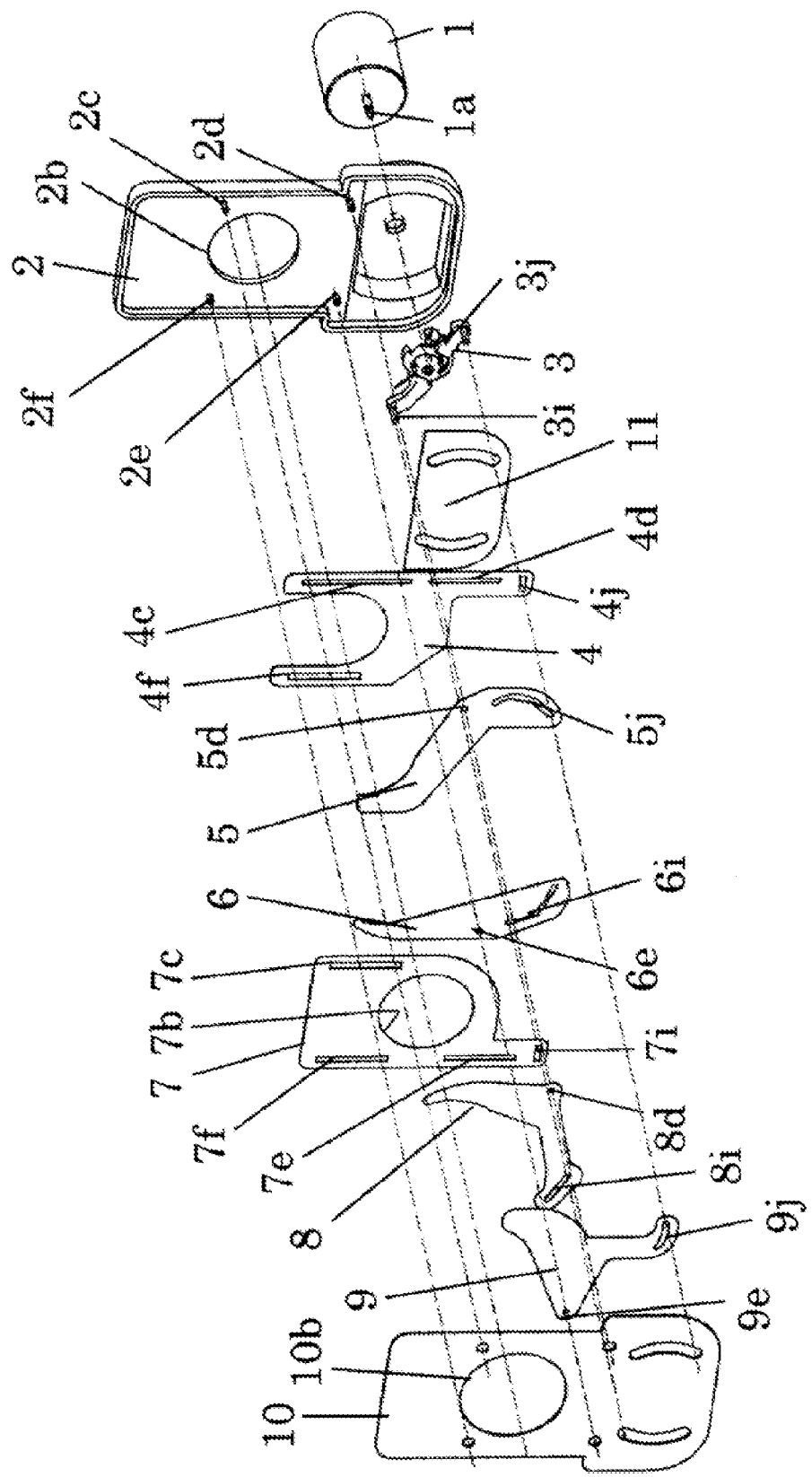
FIG. 9 is an exploded perspective view of an aperture stop apparatus that is Embodiment 4 of the present invention.
Figure 10:
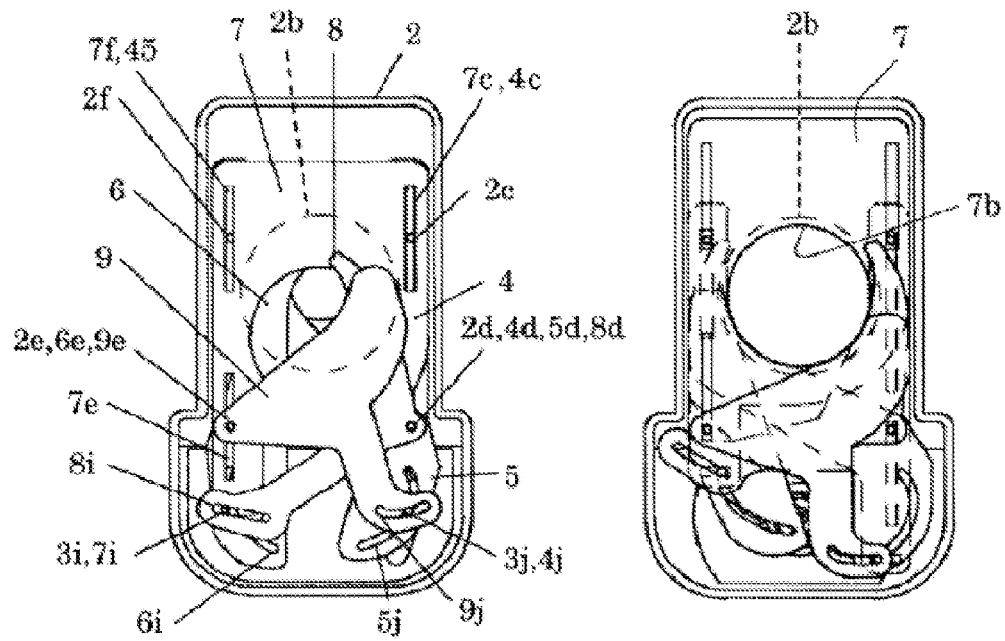
FIG. 10 is a front view of the aperture stop apparatus of Embodiment 4.
Figure 11:
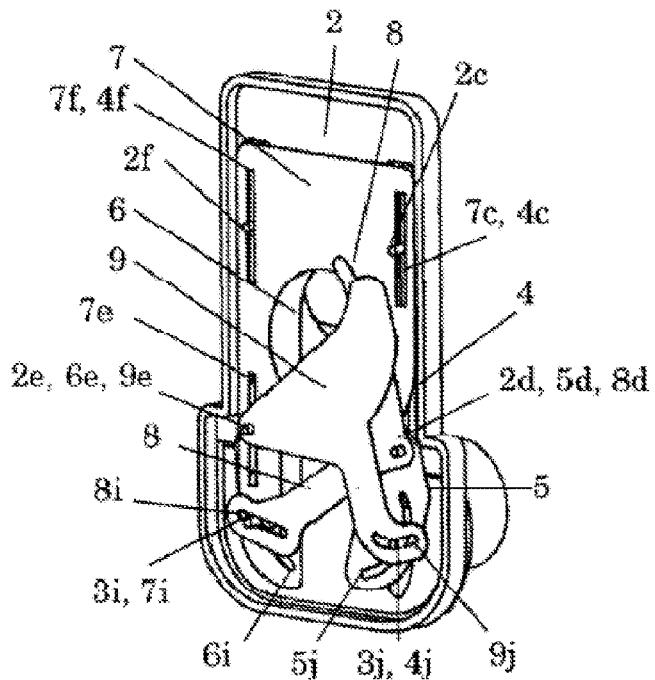
FIG. 11 is a perspective view of the aperture stop apparatus of Embodiment 4.

FIG. 9 shows a configuration of an aperture stop apparatus as a light-quantity control apparatus that is a fourth embodiment (Embodiment 4) according to the first and second aspects of the present invention. FIG. 10 shows the aperture stop apparatus viewed from the light passing direction (optical axis direction) in which the light passes through the aperture formed by the aperture blades 4 to 9, the cover plate 10 shown in FIG. 9 being omitted. A left part of FIG. 10 shows the aperture stop apparatus in a middle aperture state, and a right part thereof shows the aperture stop apparatus in a fully-opened aperture state (maximum aperture state). FIG. 11 the aperture stop apparatus viewed obliquely, the cover plate 10 being omitted.

The aperture stop apparatus of this embodiment has a same basic configuration as that of Embodiment 1. Components identical or similar to those in Embodiment 1 are denoted by same reference numerals as those in Embodiment 1, and their description is omitted. This embodiment is different from Embodiment 1 in shape of the linearly-movable aperture blade 7.

As well as Embodiment 1, this embodiment provides the two blade driving pins 3*i* and 3*j* to the driving arm 3, engages the one linearly-movable aperture blade (first aperture blade) 7 and the two rotatable aperture blades 6 and 8 with the same blade driving pin 3*i*, and engages the one linearly-movable aperture blade (first aperture blade) 4 and the two rotatable aperture blades (second aperture blade) 5 and 9 with the same blade driving pin 3*j*. Moreover, the aperture stop apparatus of this embodiment also rotates the driving arm 3 to move the two linearly-movable aperture blades 4 and 7 in the orthogonal-to-optical-axis direction and to rotate the four rotatable aperture blades 5, 6, 8 and 9 in the orthogonal-to-optical-axis surface so as to increase and decrease their parts overlapping the fixed opening. The six aperture blades 4 to 9 thus moved or rotated can form a polygonal aperture having a shape close to a circular shape and change size (diameter) of the aperture.

In this embodiment, as shown in the right part in FIG. 10, the linearly-movable aperture blade 7 is provided with a circular opening 7*b* for forming a fully-opened aperture inside the fixed opening 2*b* of the base plate 2. The opening 7*b* has a smaller diameter than that of the fixed opening 2*b*, and thereby the fully-opened aperture state provides a reference aperture diameter by the opening 7*b* of the linearly-movable aperture blade 7.

In general, aperture blades are produced by giving a shape for forming an aperture to a metal sheet or a plastic material having a light blocking effect, and need a thickness of about at least 0.2 to 0.3 mm to secure sufficient strength and light blocking effect. However, image taking lenses for cameras used in compact electronic devices such as cellular phones are miniaturized to have an entire length of only several millimeters, which requires reduction of the thickness of each aperture blade so as to enable disposition of the aperture blades in a space inside the miniaturized image taking lens. Therefore, the aperture blade formed of the metal sheet or the plastic material cannot satisfy the requirements of the strength and the light blocking effect. Moreover, even the aperture blade whose thickness is 0.2 to 0.3 mm generates ghost and flare by reflection at edges of the aperture blade.

As disclosed in Japanese Patent Laid-Open No. 2006-72151, ghost and flare can be prevented from being generated, while thinning an aperture blade, by reducing the thickness of only part of the aperture blade around an aperture, by chamfering an aperture forming edge portion of the aperture blade, and by performing anti-reflection surface treatment on an inner peripheral surface of the aperture blade (thin plate forming an aperture). However, even such an aperture blade requires a certain thickness for securing strength, which restricts the reduction in thickness and size of the aperture stop apparatus.

In this respect, this embodiment provides the opening 7*b* for forming the fully-opened aperture (or provides a fixed aperture) to the linearly-movable aperture blade 7 that is one of the aperture blades that form a variable aperture, which enables elimination of a fixed aperture member to decide the reference aperture diameter and thereby enables a reduction in the thickness and the size of the aperture stop apparatus. In addition, this embodiment enables thinning of an edge of the aperture, which is effective for a reduction of the ghost phenomenon and flare.

Moreover, this embodiment can form an aperture having a good shape while being more advantageous for miniaturization of the aperture stop apparatus, as compared with the case of rotating a driving ring around the aperture to drive the linearly-movable aperture blades and the rotatable aperture blades by mutually different driving boss portions of the driving ring.

Although this embodiment described the case of forming the fully-opened aperture inside the fixed opening 2*b* of the base plate 2 by the linearly-movable aperture blade 7, the fully-opened aperture may be formed by any one of the other aperture blades 4 to 6, 8 and 9 or by two or more of the aperture blades. In other words, the fully-opened aperture may be formed by at least one of the linearly-movable aperture blades 4 and 7 and the rotatable aperture blades 5, 6, 8 and 9. For example, the fully-opened aperture can be formed only by the linearly-movable aperture blade 4 provided with a circular opening that corresponds to the fully-opened aperture. On the other hand, the fully-opened aperture can be formed by a combination of the rotatable aperture blades 5, 6,

8 and 9 produced by setting the shape of the driving cam groove portions 5j, 6i, 8i and 9j.

Figure 12:
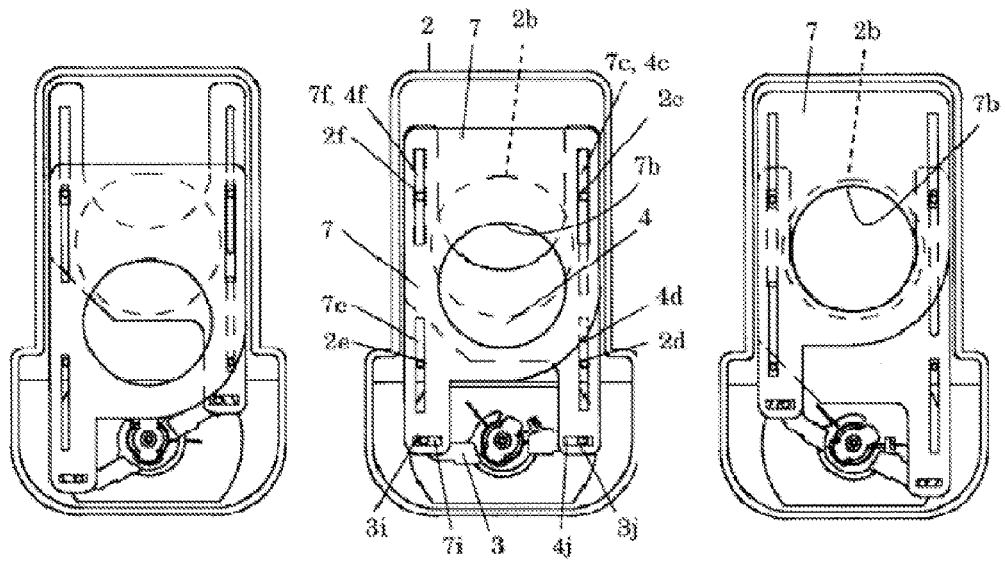
FIG. 12 is a front view of linearly-movable aperture blades used in the aperture stop apparatus of Embodiment 4.

In the aperture stop apparatus thus configured, as shown in FIG. 12, the driving arm 3 rotating within a predetermined angle range transmits a driving force from the blade driving pin 3j to the driving elongated hole portion 4j of the linearly-movable aperture blade 4, thereby moving the linearly-movable aperture blade 4 in the orthogonal-to-optical-axis direction with guiding of the guiding elongated hole portions 4c and 4d by the boss portions 2c and 2d. The driving arm 3 also transmits a driving force from the blade driving pin 3i to the driving elongated hole portion 7i of the linearly-movable aperture blade 7, thereby moving the linearly-movable aperture blade 7 the orthogonal-to-optical-axis direction with guiding of the guiding elongated hole portions 7e and 7f by the boss portions 2e and 2f.

Figure 13:
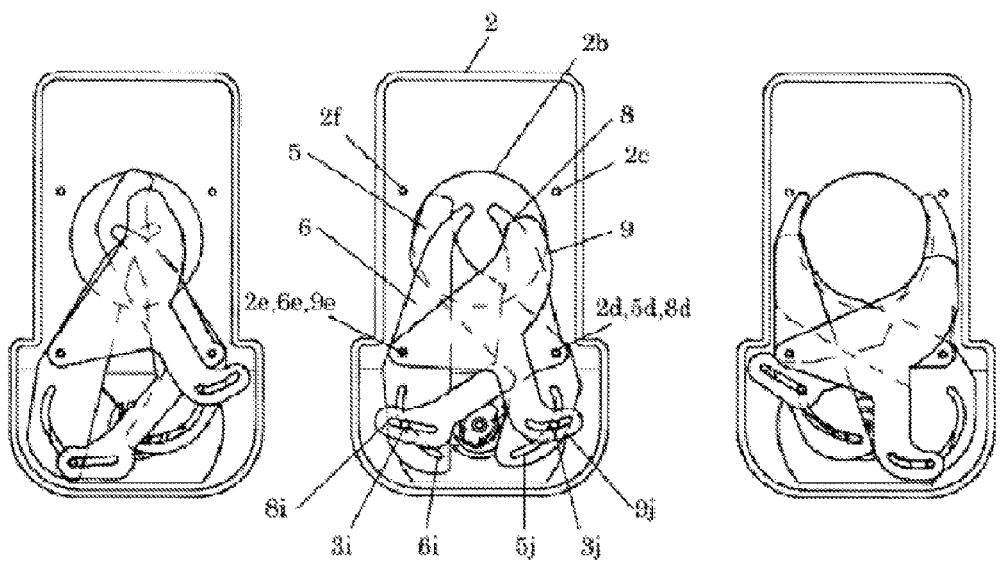
FIG. 13 is a front view of rotatable aperture blades used in the aperture stop apparatus of Embodiment 4.

Furthermore, as shown in FIG. 13, the driving arm 3 transmits a driving force respectively from the blade driving pins 3j and 3i to the driving cam groove portions 5j, 6i, 8i and 9j of the rotatable aperture blades 5, 6, 8 and 9, thereby rotating the rotatable aperture blades 5, 6, 8 and 9 (pivoted) in the orthogonal-to-optical-axis surface about the boss portions 2d and 2e with which the rotation center hole portions 5d, 6e, 8d and 9e engage. The speed of the rotation of the rotatable aperture blades 5, 6, 8 and 9 can be controlled by setting the shape of the driving cam groove portions 5j, 6i, 8i and 9j.

Figure 14:
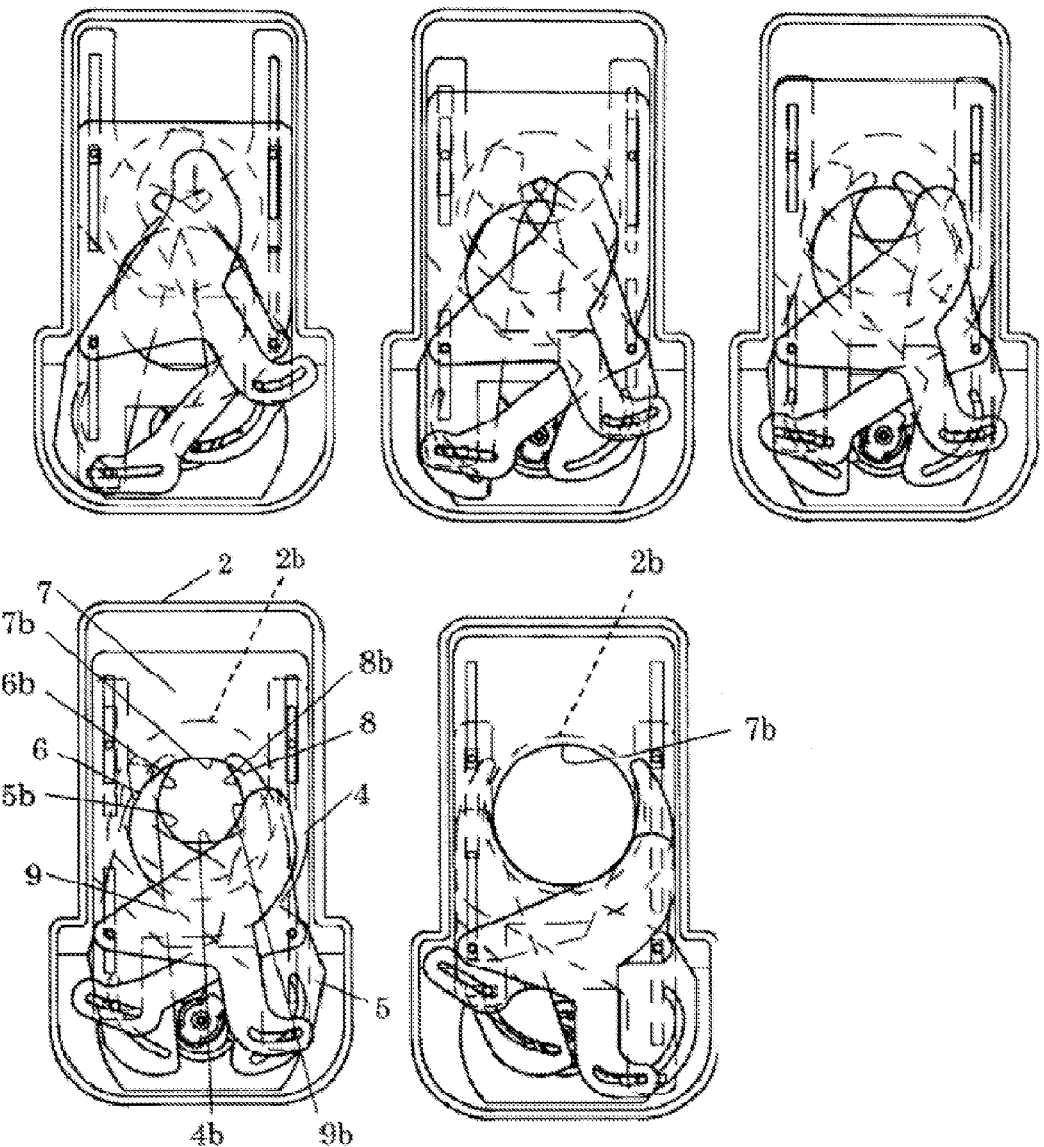
FIG. 14 is a front view showing various aperture shapes formed in the aperture stop apparatus of Embodiment 4.

This configuration makes it possible that, as shown in FIG. 14, the aperture stop apparatus of this embodiment provides, in respective aperture states from a small aperture state shown in an upper central part of FIG. 14 to an immediately before fully-opened aperture state shown in a lower left part of FIG. 14, apertures formed by aperture forming edges 4b, 5b, 6b, 8b and 9b of the aperture blades 4, 5, 6, 8 and 9 and part of an edge around the opening 7b of the linearly-movable aperture blade 7 and having a near-circular shape (or a shape close to a circular shape) or an approximate regular hexagonal shape.

Then, in the fully-opened state shown in a lower right part of FIG. 14, as also shown in a left part of FIG. 12, the linearly-movable aperture blade 7 forms, by its opening 7b, the fully-opened aperture radially inside the fixed aperture 2b of the base plate 2.

Moreover, the aperture stop apparatus of this embodiment can close off the aperture, as shown in an upper left part in FIG. 14.

As described above, the aperture stop apparatus of this embodiment rotates the single driving arm 3 to move the linearly-movable aperture blades 4 and 7 and rotate the rotatable aperture blades 5, 6, 8 and 9, without using a member such as a driving ring to be rotated around the aperture. This configuration enables miniaturization of the aperture stop apparatus in its longitudinal direction and its width direction, and enables a reduction in thickness of the aperture stop apparatus in the optical axis direction.

Although this embodiment described the case of providing the hole and groove portions to the aperture blades 4 to 9 and engaging (inserting) the pins provided in the driving arm 3 and the base plate 2 with (into) the hole and groove portions, another configuration may be employed which provides pins to the aperture blades and inserting the pins into hole and groove portions provided in the driving arm and the base plate.

Embodiment 5

Figure 15:
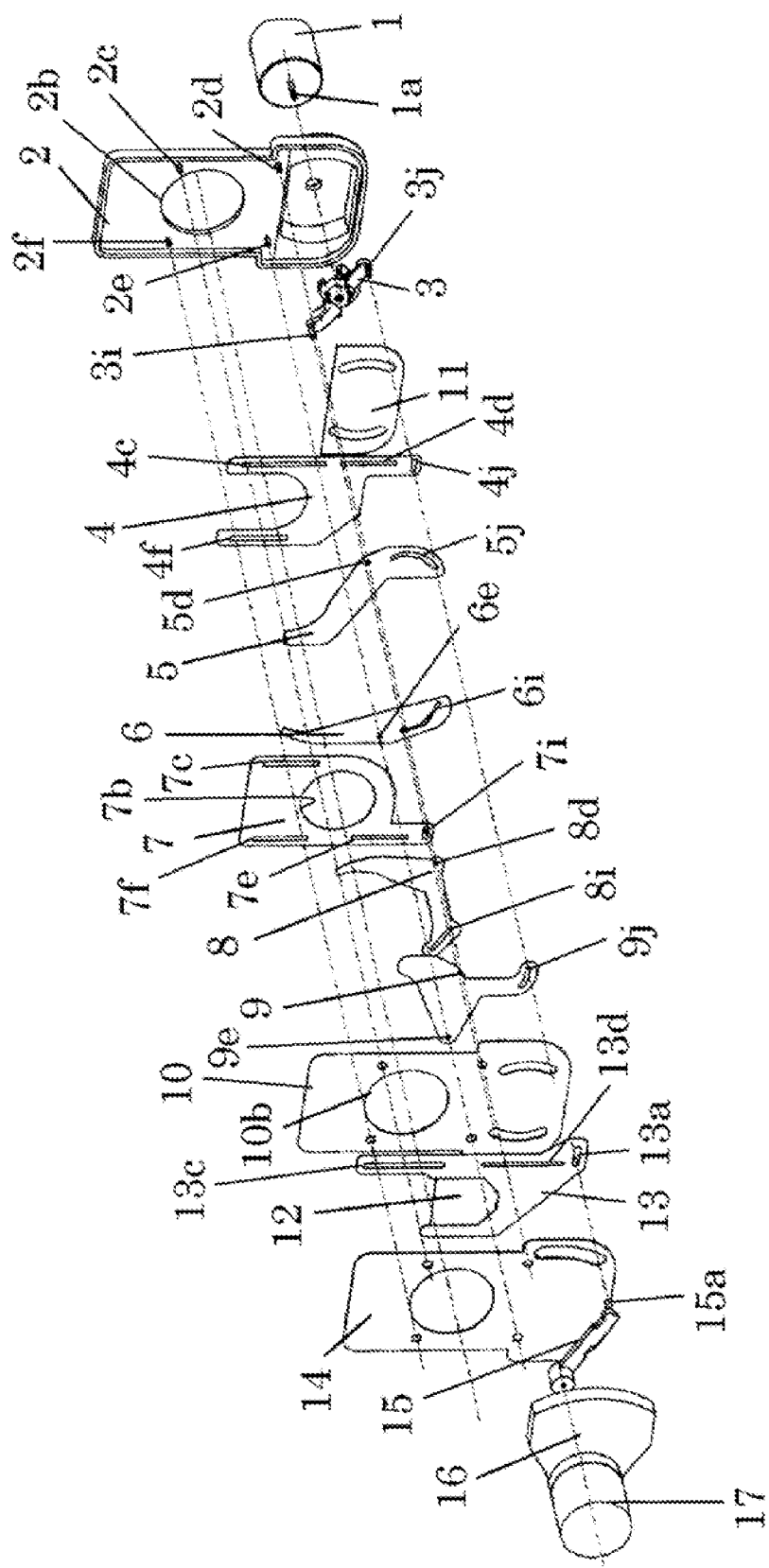
FIG. 15 is an exploded perspective view of an aperture stop apparatus that is Embodiment 5 of the present invention.

FIG. 15 shows a configuration of an aperture stop apparatus as a light-quantity control apparatus that is a fifth embodiment (Embodiment 5) according to the first and second aspects of the present invention. The aperture stop apparatus of this embodiment is provided with, in addition to the aperture blades 4 to 9 described in Embodiment 4 (FIG. 9), an ND (neutral density) filter 12 capable of reducing the quantity of light passing through the aperture and movable so as to cover the aperture and retract therefrom. In FIG. 15, components identical or similar to those shown in FIG. 9 are denoted by same reference numerals as those in FIG. 9, and their description is omitted.

An ND holding plate 13 holds the ND filter 12. The ND holding plate 13 is disposed on a side opposite to the aperture blades 4 to 9 across the cover plate 10. An outer cover plate 14 is attached to the base plate 2 to form with the base plate 10 a space where the ND holding plate 13 can be moved.

A sub base plate 16 to which an ND driver 17 is fixed is attached to the outer cover plate 14. The ND driver 17 is, for example, an electromagnetic motor constituted by a rotor magnet (not shown), an output shaft (not shown) rotatable integrally with the rotor magnet and a coil (not shown) to be energized to generate magnetic force for rotating the rotor magnet. The ND driver 17 may be constituted by a stepping motor.

An ND arm 15 is attached to the output shaft of the ND driver 17 by press fitting (or formed integrally therewith), and has, at its end, a driving pin 15a. The driving pin 15a extends so as to penetrate the outer cover plate 14 and engages with a driving elongated hole portion 13a formed in a lower end part of the ND holding plate 13. The ND holding plate 13 is further provided with guiding elongated hole portions 13c and 13d formed so at to extend in the orthogonal-to-optical-axis direction. The boss portions 2c and 2d of the base plate 2 slidably engage respectively with the guiding elongated hole portions 13c and 13d.

The ND arm 15 rotated by the ND driver 17 transmits a driving force from the driving pin 15a to the driving elongated hole portion 13a of the ND holding plate 13, thereby moving the ND holding plate 13 in the orthogonal-to-optical-axis direction with guiding of the guiding elongated hole portions 13c and 13d by the boss portions 2c and 2d. Thereby, the ND filter 12 is moved so as to cover the aperture and retract therefrom.

A configuration may be employed in which the ND holding plate 13 is movable in the orthogonal-to-optical-axis direction with being swung in the width direction, as well as the linearly-movable aperture blades 4 and 7.

Also this embodiment causes, in the fully-opened aperture state, as described in Embodiment 4, the opening 7b provided in the linearly-movable aperture blade 7 or the aperture forming edges (or opening) provided in the other aperture blades 4 to 6, 8 and 9 to form, inside the fixed opening 2b of the base plate 2, the fully-opened aperture whose diameter is smaller than the fixed opening 2b.

In addition, this embodiment can reduce light-quantity by covering the aperture with the ND filter 12 without narrowing the aperture to a very small size, which can avoid deterioration of image quality due to so-called small aperture diffraction. Moreover, ghost and blur formed by the aperture stop apparatus of this embodiment also have a shape close to a circular shape, which makes it possible to provide more natural image quality.

Embodiment 6

Figure 16:
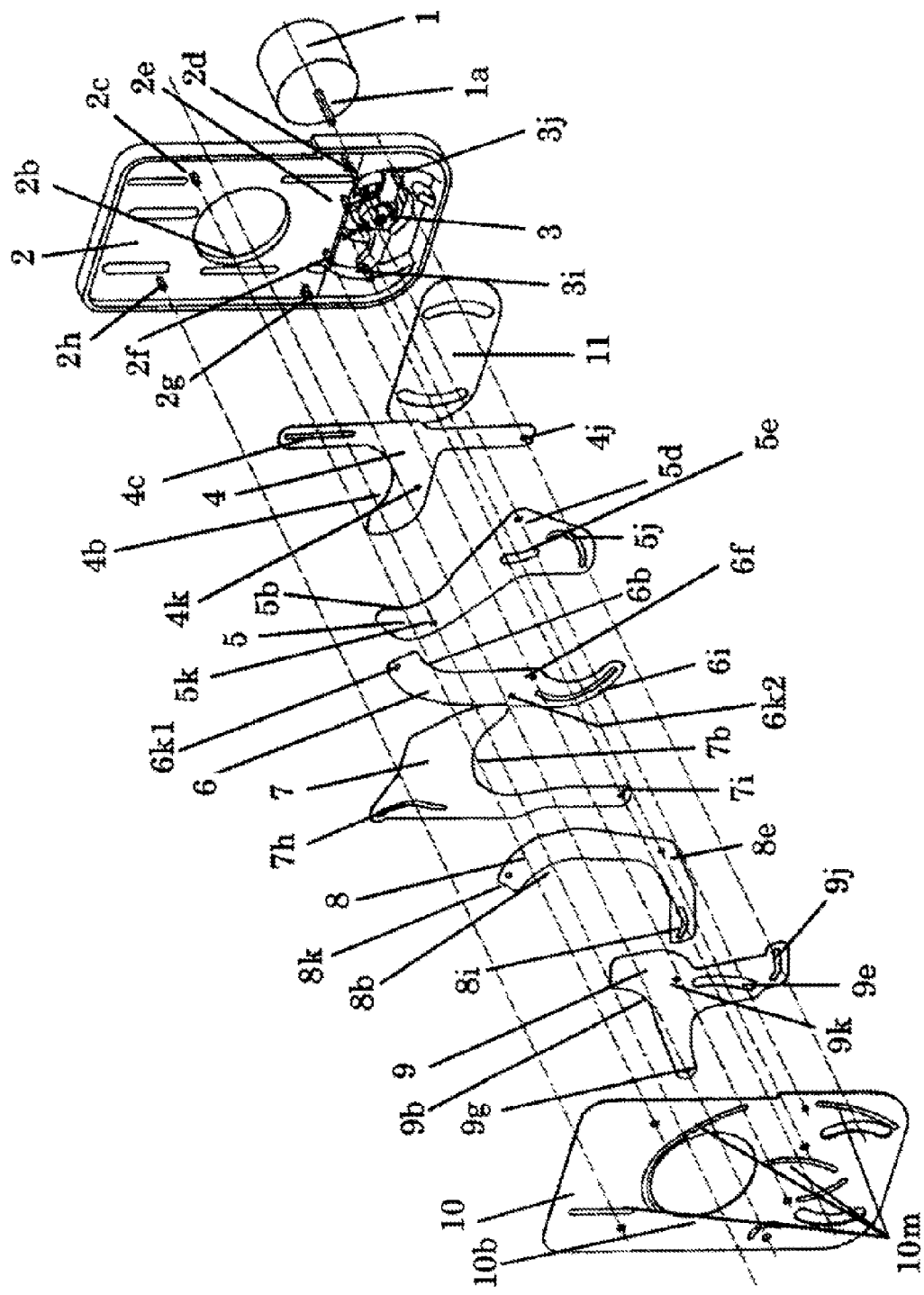
FIG. 16 is an exploded perspective view of an aperture stop apparatus that is Embodiment 6 of the present invention.
Figure 17:
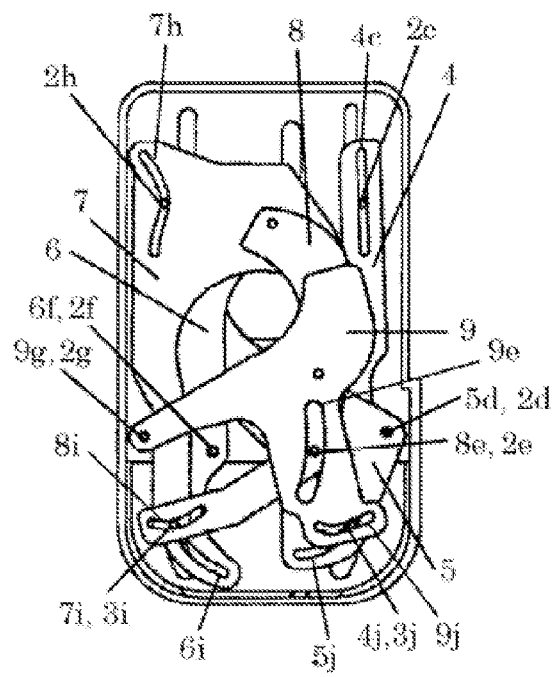
FIG. 17 is a front view of the aperture stop apparatus of Embodiment 6.
Figure 18:
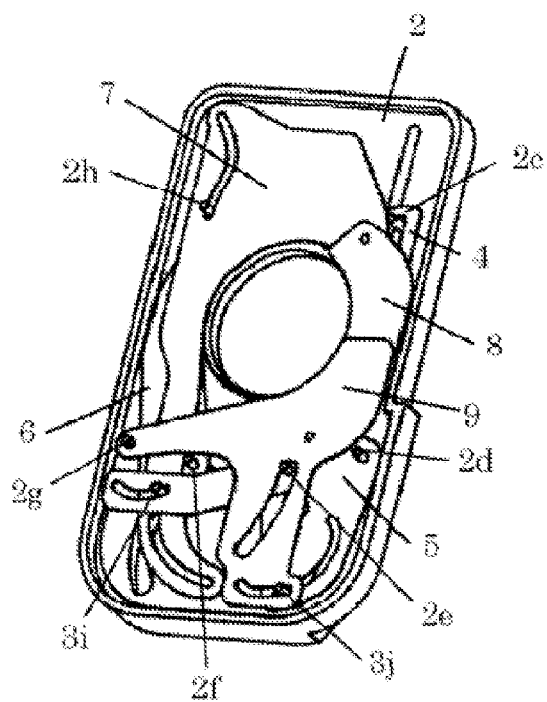
FIG. 18 is a perspective view of the aperture stop apparatus of Embodiment 6.

FIG. 16 shows a configuration of an aperture stop apparatus as a light-quantity control apparatus that is a sixth embodiment (Embodiment 6) according to the second and third aspects of the present invention. FIG. 17 shows the aperture stop apparatus viewed from a light passing direction (optical axis direction) in which light passes through an aperture formed by aperture blades 4 to 9, a cover plate 10 shown in FIG. 16 being removed. FIG. 18 shows the aperture stop apparatus shown in FIG. 17 viewed obliquely, the cover plate 10 being removed. In these figures, an up-down direction, which is a longitudinal direction of the aperture stop apparatus, corresponds to "a direction orthogonal to the light passing direction" and is hereinafter referred to as "an orthogonal-to-optical-axis direction". Moreover, in these figures, aright-left direction of the aperture stop apparatus is hereinafter referred to as "a width direction".

In FIGS. 16 to 18, a base plate 2 as a base member is provided with a fixed opening 2b allowing light to pass therethrough. The base plate 2 is produced by press working, resin molding or the like. At a position away downward from the fixed opening 2b of an outer face (that is, a face on one side in the optical axis direction) of the base plate 2, an aperture stop driver 1 is attached. The aperture stop driver 1 is, for example, an electromagnetic motor constituted by a rotor magnet (not shown), an output shaft 1a rotatable integrally with the rotor magnet and a coil (not shown) to be energized to generate magnetic force for rotating the rotor magnet. The aperture stop driver 1 may be constituted by a stepping motor.

The output shaft 1a of the aperture stop driver 1 extends so as to penetrate the base plate 2 and protrude on an inner face side of the base plate 2. At a tip of the output shaft 1a, a driving arm 3 as a driving lever is attached by press fitting. The driving arm 3 is rotatable together with the output shaft 1a about an axis located away downward from the fixed opening 2b within a predetermined angle range. The driving arm 3 produced by resin molding or the like. The output shaft 1a and the driving arm 3 may be integrally formed.

The driving arm 3 has, at its both ends across its portion attached to the output shaft 1a, blade driving pins 3i and 3j as transmitting portions to drive aperture blades 4 to 9. The blade driving pins 3i engages with three aperture blades: a rotatable aperture blade 6, a linearly-movable aperture blade 7 and a rotatable aperture blade 8. On the other hand, the blade driving pins 3j engages with other three aperture blades: a linearly-movable aperture blade 4, a rotatable aperture blade 5 and a rotatable aperture blade 9.

A configuration may be employed in which the aperture stop driver 1 and the driving arm 3 are disposed on an outer face side of the base plate 2 and the blade driving pins 3i and 3j extend so as to penetrate the base plate 2 and protrude on the inner face side of the base plate 2.

Thus, the aperture stop apparatus of this embodiment provides the two blade driving pins 3i and 3j to the single driving arm 3 directly attached to (or formed integrally with) the output shaft 1a of the aperture stop driver 1, and engages the one linearly-movable aperture blade 7 as one of two first aperture blades and the two rotatable aperture blades 6 and 8 as two of four second aperture blades with the same (common) driving pin 3i. Moreover, the aperture stop apparatus of this embodiment engages the one linearly-movable aperture blade 4 as another one of the two first aperture blades and the two rotatable aperture blades 5 and 9 as other two of the four second aperture blades with the same (common) driving pin 3j.

The aperture stop apparatus of this embodiment rotates the driving arm 3 whose each of the blade driving pins 3i and 3j engages with the three aperture blades to move the two linearly-movable aperture blades 4 and 7 in the orthogonal-to-optical-axis direction and to rotate the rotatable aperture blades 5, 6, 8 and 9 in the surface orthogonal to the optical axis direction (hereinafter referred to as "an orthogonal-to-optical-axis surface") so as to increase and decrease their parts overlapping the fixed opening. The six aperture blades 4 to 9 thus moved or rotated can form a polygonal aperture having a shape close to a circular shape (or a near-circular shape) and change size (or diameter) of the aperture.

The above-described configuration is advantageous for miniaturization of the aperture stop apparatus while enabling formation of an aperture having a good shape as compared with the conventional configuration disclosed in Japanese Patent Laid-Open No. 2009-115831 which rotates the driving ring around the aperture and drives the linearly-movable aperture blades and the rotatable aperture blades by mutually separate transmitting portions.

The movement of the linearly-movable aperture blades 4 and 7 in the orthogonal-to-optical-axis direction means not only linear movement (translation) thereof in the orthogonal-to-optical-axis, but also movement thereof in the orthogonal-to-optical-axis with being swung (rotated) or shifted in the width direction.

An arm cover 11 is disposed between the driving arm 3 and the aperture blade 4 (to 9) to prevent unnecessary contact (interference) therewith. The arm cover 11 is produced by press working, resin molding or the like. The arm cover 11 can be omitted when the driving arm 3 and the aperture blade 4 are disposed with a sufficient clearance gap therebetween.

The cover plate 10 is attached to the base plate 2 so as to form with the base plate 2 a space where the aperture blades 4 to 9 can be moved. The cover plate 10 is provided with an opening 10b corresponding to the fixed opening 2b formed in the base plate 2. The cover plate 10 is produced by press working, resin molding or the like. The cover plate 10 is further provided with rails 10m on its inner face (base member side face) to reduce slide resistance with the aperture blades 4 to 9.

The aperture stop apparatus of this embodiment can, as described above, change the aperture diameter by rotating the driving arm 3 and completely close (close off) the aperture. Thus, this aperture stop apparatus of this embodiment can perform a shutter operation, which enables use of the aperture stop apparatus as an aperture stop and shutter apparatus.

A detailed description of the respective aperture blades will hereinafter be made. The aperture blades 4 to 9 are produced by press working, resin molding or the like. Moreover, the aperture blades 4 to 6, 8 and 9 are provided with embossed portions 4k, 5k, 6k1, 6k2, 8k and 9k in order to prevent mutually adjacent aperture blades from sticking to each other due to static electricity and in order to reduce slide resistance therebetween.

The linearly-movable aperture blade 4 rotatably engages, at its circular driving hole portion 4j that is a first engaging portion, with the blade driving pin 3j of the driving arm 3. Moreover, a guiding pin 2c as a guiding portion (or a guiding boss portion) provided in the base plate 2 slidably engages with a guiding elongated hole portion 4c formed as a second engaging portion in the linearly-movable aperture blade 4 so as to extend in the orthogonal-to-optical-axis direction.

Figure 19:
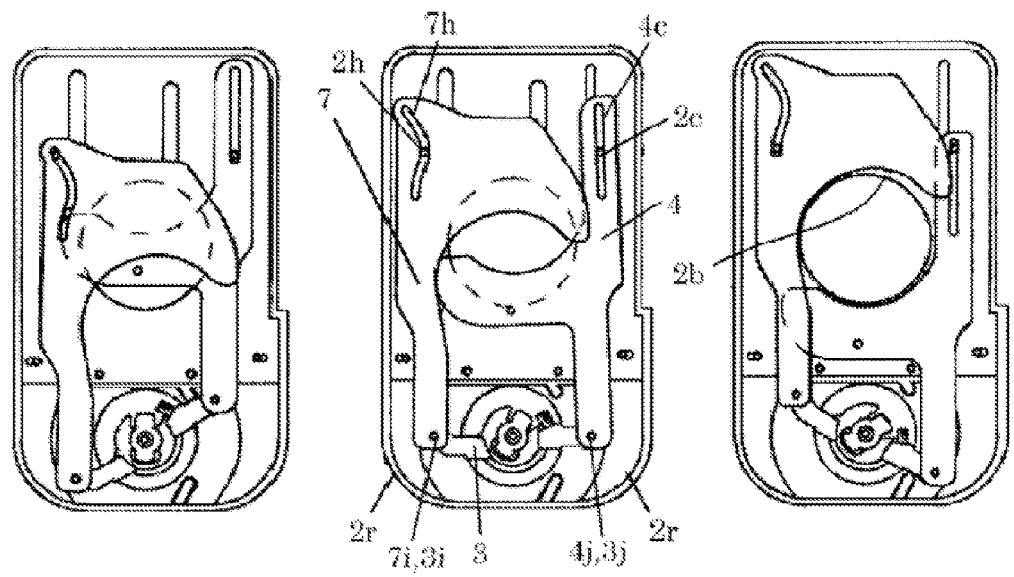
FIG. 19 is a front view of linearly-movable aperture blades used in the aperture stop apparatus of Embodiment 6.

As shown in FIG. 19, the driving arm 3 rotating within the above-mentioned predetermined angle range transmits a driving force from the blade driving pin 3j to the driving hole portion 4j of the linearly-movable aperture blade 4, thereby rotating the linearly-movable aperture blade 4 about the blade driving pin 3j and moving the linearly-movable aperture blade 4 in the orthogonal-to-optical-axis direction with guiding of the guiding elongated hole portion 4c by the guiding pin 2c.

During the driving of the linearly-movable aperture blade 4, the blade driving pin 3j is moved so as to draw a circular arc about the output shaft 1a, so that the linearly-movable aperture blade 4 is swung in the width direction about the guiding pin 2c with being guided in the orthogonal-to-optical-axis direction by the guiding pin 2c. That is, the linearly-movable aperture blade 4 is swung, when being moved to a lower end of the base plate 2 to be retracted with respect to the fixed opening 2b, such that the driving hole portion 4j is pulled closer to a line connecting a center of the fixed opening 2b and the output shaft 1a. Such swing of the linearly-movable aperture blade 4 in this embodiment allows that a right corner portion 2r of the base plate 2 shown in FIG. 19 is formed in a circular arc shape so as to be retracted inward (closer to the output shaft 1a) as compared with a case where the linearly-movable aperture blade 4 is simply moved linearly without being swung, which makes it possible to decrease size of the base plate 2.

Moreover, in the case where the linearly-movable aperture blade 4 is simply moved linearly without being swung, it is necessary to form the driving hole portion 4j in an elongated hole shape and to provide two guiding pins 2c in the base plate 2, and further to provide two guiding elongated hole portions in the linearly-movable aperture blade 4. However, in this embodiment, the linearly-movable aperture blade 4 is moved in the orthogonal-to-optical-axis direction with being swung, and thereby only one guiding pin 2c and one guiding elongated hole portion 4c is needed respectively in the base plate 2 and the linearly-movable aperture blade 4. This configuration makes it possible to decrease size of the linearly-movable aperture blade 4 and to further decrease the size of the base plate 2, which enables miniaturization of the aperture stop apparatus and an optical apparatus including the aperture stop apparatus, such as a camera and an interchangeable lens.

The speed of the swing of the linearly-movable aperture blade 4 about the guiding pin 2c can be controlled by forming the guiding elongated hole portion 4c in a cam groove shape. Moreover, in this embodiment, adjusting the cam groove shape of the guiding elongated hole portion 4c makes it possible to correct shape of the aperture to a good shape, which is different from the case where the linearly-movable aperture blade 4 is simply moved linearly without being swung.

The rotatable aperture blade 5 slidably engages, at its driving cam groove portion 5j that is a third engaging portion, with the blade driving pin 3i of the driving arm 3. Moreover, a rotation center pin 2d as a rotation center portion (or a rotation center boss portion) provided in the base plate 2 rotatably engages with a rotation center hole portion 5d formed as a fourth engaging portion in the rotatable aperture blade 5.

Figure 20:
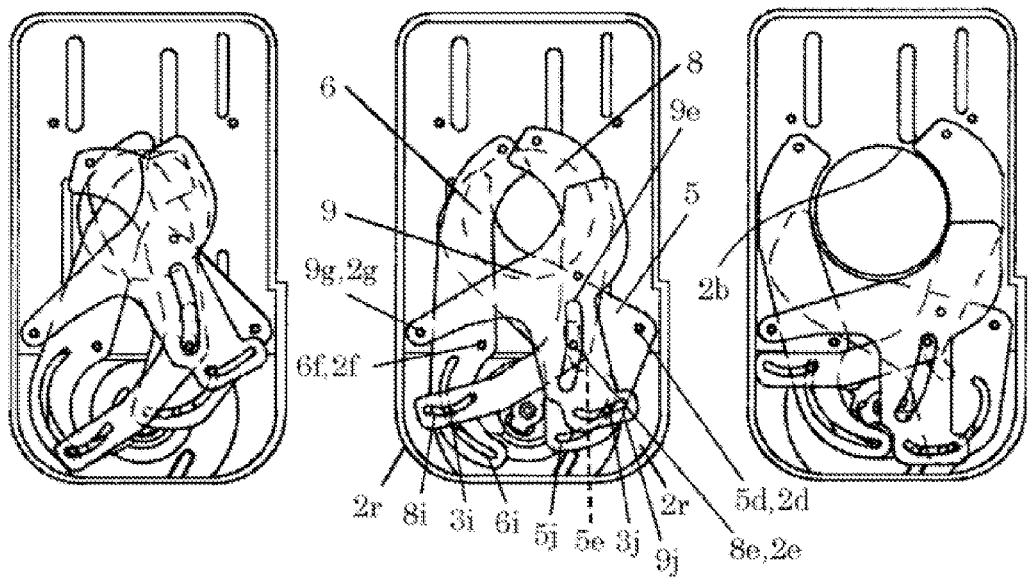
FIG. 20 is a front view of rotatable aperture blades used in the aperture stop apparatus of Embodiment 6.

As shown in FIG. 20, the driving arm 3 rotating within the predetermined angle range transmits a driving force from the blade driving pin 3j to the driving cam groove portion 5j of the rotatable aperture blade 5, thereby rotating the rotatable aperture blade 5 (pivoted) in a surface orthogonal to the optical axis direction (hereinafter referred to as "an orthogonal-to-optical-axis surface") about the rotation center pin 2d with which the rotation center hole portion 5d engages. The speed of the rotation of the rotatable aperture blade 5 can be controlled by setting the shape of the driving cam groove portion 5j. Moreover, adjusting the shape of the guiding cam groove portion 5j makes it possible to correct shape of the aperture.

The rotatable aperture blade 5 is provided with an elongated hole portion 5e through which a rotation center pin 2e engaging with the rotatable aperture blade 8 is penetrated to avoid interference with the rotation center pin 2e. The penetration of the rotation center pin 2e through the elongated hole portion 5e enables provision of a shape ensuring sufficient strength to the rotatable aperture blade 5, and enables efficient disposition of the rotation center pin 2e in the base plate 2. Moreover, the elongated hole portion 5e formed in the rotatable aperture blade 5 enables reduction in weight of the rotatable aperture blade 5, which is advantageous for shutter operation.

The rotatable aperture blade 6 slidably engages, at its driving cam groove portion 6i that is a third engaging portion, with the blade driving pin 3i of the driving arm 3. Moreover, a rotation center pin 2f as a rotation center portion (or a rotation center boss portion) provided in the base plate 2 rotatably engages with a rotation center hole portion 6f formed as a fourth engaging portion in the rotatable aperture blade 6.

As shown in FIG. 20, the driving arm 3 rotating within the predetermined angle range transmits a driving force from the blade driving pin 3i to the driving cam groove portion 6i of the rotatable aperture blade 6, thereby rotating the rotatable aperture blade 6 (pivoted) in the orthogonal-to-optical-axis surface about the rotation center pin 2f with which the rotation center hole portion 6f engages. The speed of the rotation of the rotatable aperture blade 6 can be controlled by setting the shape of the driving cam groove portion 6i. Moreover, adjusting the shape of the guiding cam groove portion 6i makes it possible to correct shape of the aperture.

The linearly-movable aperture blade 7 rotatably engages, at its circular driving hole portion 7i that is a first engaging portion, with the blade driving pin 3i of the driving arm 3. Moreover, a guiding pin 2h as a guiding portion (or a guiding boss portion) provided in the base plate 2 slidably engages with a guiding cam groove portion 7h formed as a second engaging portion in the linearly-movable aperture blade 7 so as to extend in the orthogonal-to-optical-axis direction and have a cam lift in the width direction.

As shown in FIG. 19, the driving arm 3 rotating within the predetermined angle range a transmits driving force from the blade driving pin 3i to the driving hole portion 7i of the linearly-movable aperture blade 7, thereby rotating the linearly-movable aperture blade 7 about the blade driving pin 3i and moving the linearly-movable aperture blade 7 in the orthogonal-to-optical-axis direction with shift and swing in the width direction caused by the engagement of the guiding cam groove portion 7h with the guiding pin 2h. As well as the swing of the linearly-movable aperture blade 4, the shift of the linearly-movable aperture blade 7 in the width direction allows that a left corner portion 2r of the base plate 2 shown in FIG. 19 is formed in a circular arc shape so as to be retracted inward (closer to the output shaft 1a) as compared with the case where the linearly-movable aperture blade 7 is simply moved linearly without the swing, which makes it possible to decrease the size of the base plate 2. Lens barrel portions of the optical apparatuses including the aperture stop apparatus generally have a circular cross section, and therefore the circular arc shape of the right and left corner portions 2r is effective for miniaturization of the lens barrel portion (that is, miniaturization of the optical apparatus).

The speeds of the shift and swing of the linearly-movable aperture blade 7 can be controlled by shape of the guiding cam groove portion 7h. Other movements of the linearly-movable aperture blade 7 are similar to those of the linearly-movable aperture blade 4.

The rotatable aperture blades 8 and 9 slidably engages respectively, at their driving cam groove portions 8i and 9j that are third engaging portions, with the blade driving pins 3i and 3j of the driving arm 3. Moreover, the rotation center pin 2e and a rotation center pin 2g as rotation center portions (or rotation center boss portions) provided in the base plate 2 rotatably engage respectively with rotation center hole portions 8e and 9g formed as fourth engaging portions in the rotatable aperture blades 8 and 9.

As shown in FIG. 20, the driving arm 3 rotating within the predetermined angle range transmits a driving force from the blade driving pins 3i and 3j to the driving cam groove portions 8i and 9j of the rotatable aperture blades 8 and 9, thereby rotating the rotatable aperture blades 8 and 9 (pivoted) in the orthogonal-to-optical-axis surface about the rotation center pins 2e and 2g with which the rotation center hole portions 8e and 9g respectively engages. The speed of the rotation of the rotatable aperture blades 8 and 9 can be controlled by setting the shape of the driving cam groove portions 8i and 9j. Moreover, adjusting the shape of the guiding cam groove portions 8i and 9j makes it possible to correct shape of the aperture. The rotatable aperture blade 9 is provided with, as well as the rotatable aperture blade 5, an elongated hole portion 9e through which the rotation center pin 2e engaging with the rotatable aperture blade 8 is penetrated to avoid interference with the rotation center pin 2e.

The above-described right and left corner portions 2r of the base plate 2 can be formed further inside by arbitrarily adjusting timing of the rotation of the rotatable aperture blades 5, 6, 8 and 9 through setting of the shape of their driving cam groove portions 5j, 6i, 8i and 9j, which is effective for further miniaturization of the lens barrel portion.

Figure 21:
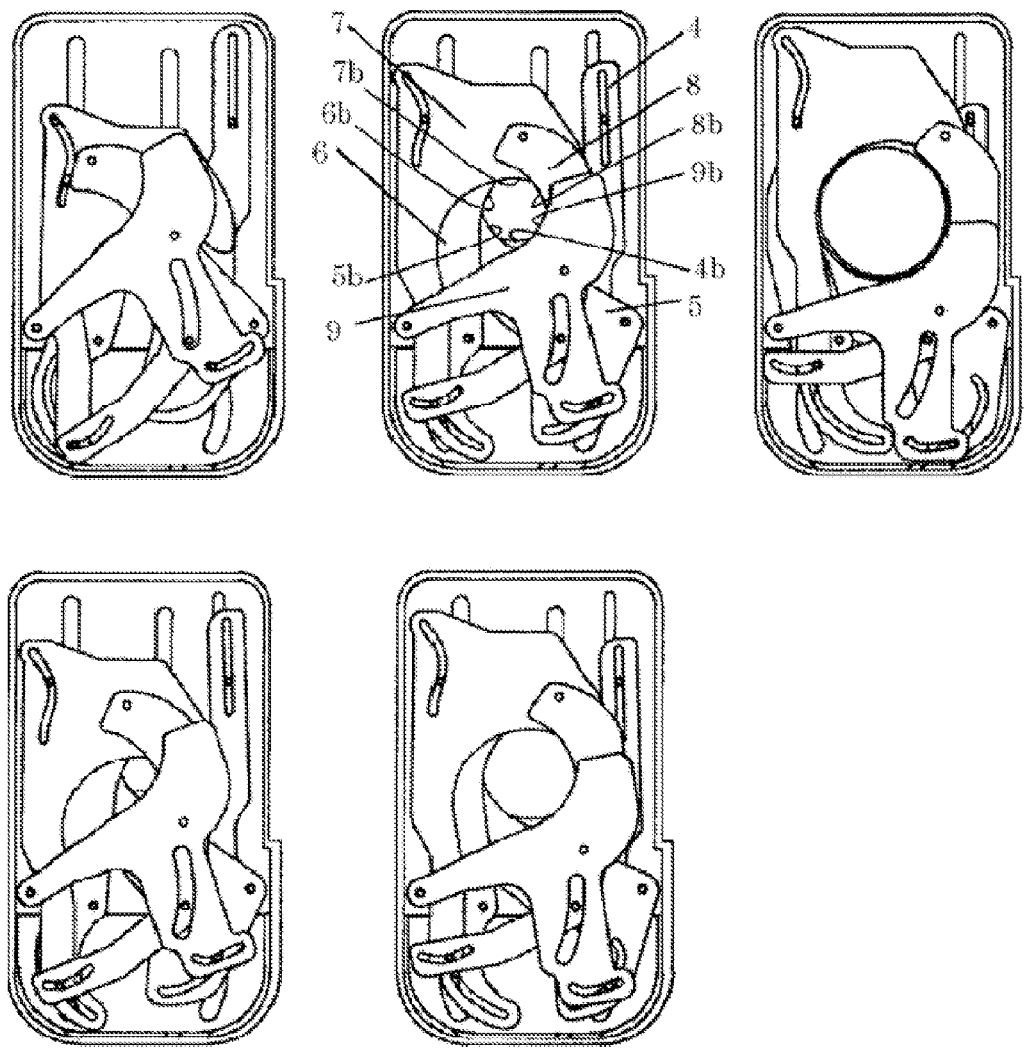
FIG. 21 is a front view showing various aperture shapes formed in the aperture stop apparatus of Embodiment 6.

Furthermore, the movement or rotation position of the aperture blades 4 to 9 with respect to rotation position of the driving arm 3 can be controlled by the shape of the guiding elongated hole portion 4c, the guiding cam groove portion 7h and the driving cam groove portions 5j, 6i, 8i and 9j. Such control makes it possible to form, in respective aperture states from a fully-opened aperture state shown in an upper right part of FIG. 21 to a small aperture state shown in a lower left part of FIG. 21, apertures having a near-circular shape or an approximately regular hexagonal shape by aperture forming edges 4b, 5b, 6b, 7b, 8b and 9b of the aperture blades 4 to 9. In addition, the aperture stop apparatus of this embodiment can close off the aperture, as shown in an upper left part of FIG. 21.

As described above, the aperture stop apparatus of this embodiment rotates the single driving arm 3 to move the aperture blades 4 to 9, without using a member such as a driving ring to be rotated around the aperture. This configuration enables miniaturization of the aperture stop apparatus in its longitudinal direction and its width direction, and enables reduction in thickness of the aperture stop apparatus in the optical axis direction.

Although this embodiment described the case of providing the hole and groove portions to the aperture blades 4 to 9 and engaging (inserting) the pins provided in the driving arm 3 and the base plate 2 with (into) the hole and groove portions, another configuration may be employed which provides pins to the aperture blades and inserting the pins into hole and groove portions provided in the driving arm and the base plate.

Moreover, although not shown in the figure, as described in Embodiment 4, a fully-opened aperture having a smaller diameter than that of the fixed opening 2b of the base plate 2 may be formed inside the fixed opening 2b by an opening provided in the linearly-movable aperture blade 7 or the aperture forming edges (or an opening) of the other aperture blades 4 to 6, 8 and 9. This configuration enables decrease in thickness and size of the aperture stop apparatus, and further enables reduction of ghost and flare by thinning of an edge of the aperture.

Embodiment 7

Figure 22:
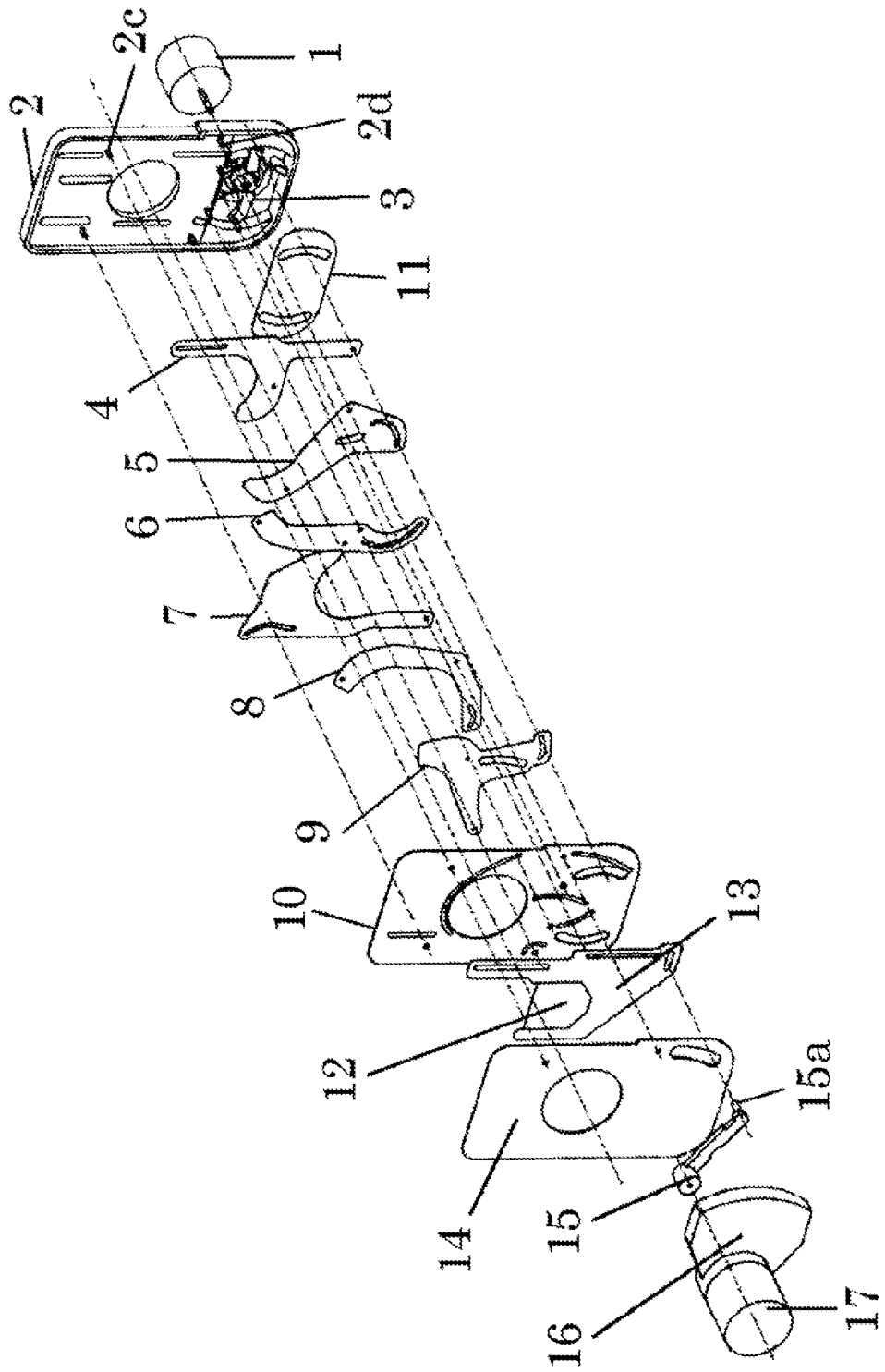
FIG. 22 is an exploded perspective view of an aperture stop apparatus that is Embodiment 7 of the present invention.

FIG. 22 shows a configuration of an aperture stop apparatus as a light-quantity control apparatus that is a seventh embodiment (Embodiment 7) according to the second and third aspects of the present invention. The aperture stop apparatus of this embodiment is provided with, in addition to the aperture blades 4 to 9 described in Embodiment 6 (FIG. 16), an ND (neutral density) filter 12 capable of reducing quantity of light passing through the aperture and movable so as to cover the aperture and retract therefrom. In FIG. 22, components identical to those shown in FIG. 16 are denoted by same reference numerals as those in FIG. 16, and their description is omitted.

An ND holding plate 13 holds the ND filter 12. The ND holding plate 13 is disposed on a side opposite to the aperture blades 4 to 9 across the cover plate 10. An outer cover plate 14 is attached to the base plate 2 to form with the base plate 10 a space where the ND holding plate 13 can be moved.

A sub base plate 16 to which an ND driver 17 is fixed is attached to the outer cover plate 14. The ND driver 17 is, for example, an electromagnetic motor constituted by a rotor magnet (not shown), an output shaft (not shown) rotatable integrally with the rotor magnet and a coil (not shown) to be energized to generate a magnetic force for rotating the rotor magnet. The ND driver 17 may be constituted by a stepping motor.

An ND arm 15 is attached to the output shaft of the ND driver 17 by press fitting (or formed integrally therewith), and has, at its end, a driving pin 15a. The driving pin 15a extends so as to penetrate the outer cover plate 14 and engages with the ND holding plate 13. The ND holding plate 13 is guided by the guiding pin 2c and the rotation center pin 2d that are provided with the base plate 2 in the orthogonal-to-optical-axis direction. The ND arm 15 rotated by the ND driver 17 moves the ND holding plate 13 linearly in the orthogonal-to-optical-axis direction and thereby the ND filter 12 is moved so as to cover the aperture and retract therefrom.

A configuration may be employed in which the ND holding plate 13 is movable in the orthogonal-to-optical-axis direction with being swung in the width direction, as well as the linearly-movable aperture blades 4 and 7.

Thus, the configuration described in Embodiment 6 can be applied also to the aperture stop apparatus provided with the ND filter 12. Covering the aperture by the ND filter 12 can reduce light-quantity without narrowing the aperture to a very small size, which can avoid deterioration of image quality due to so-called small aperture diffraction. Moreover, ghost and blur formed by the aperture stop apparatus of this embodiment also have a near-circular shape, which makes it possible to provide more natural image quality.

Although not shown in the figure, as described in Embodiment 4, a fully-opened aperture having a smaller diameter than that of the fixed opening 2b of the base plate 2 may be formed inside the fixed opening 2b by an opening provided in the linearly-movable aperture blade 7 or the aperture forming edges (or the opening) of the other aperture blades 4 to 6, 8 and 9. This configuration enables a decrease in thickness and size of the aperture stop apparatus, and further enables a reduction of ghost and flare by thinning of an edge of the aperture.

Embodiment 8

Figure 23:
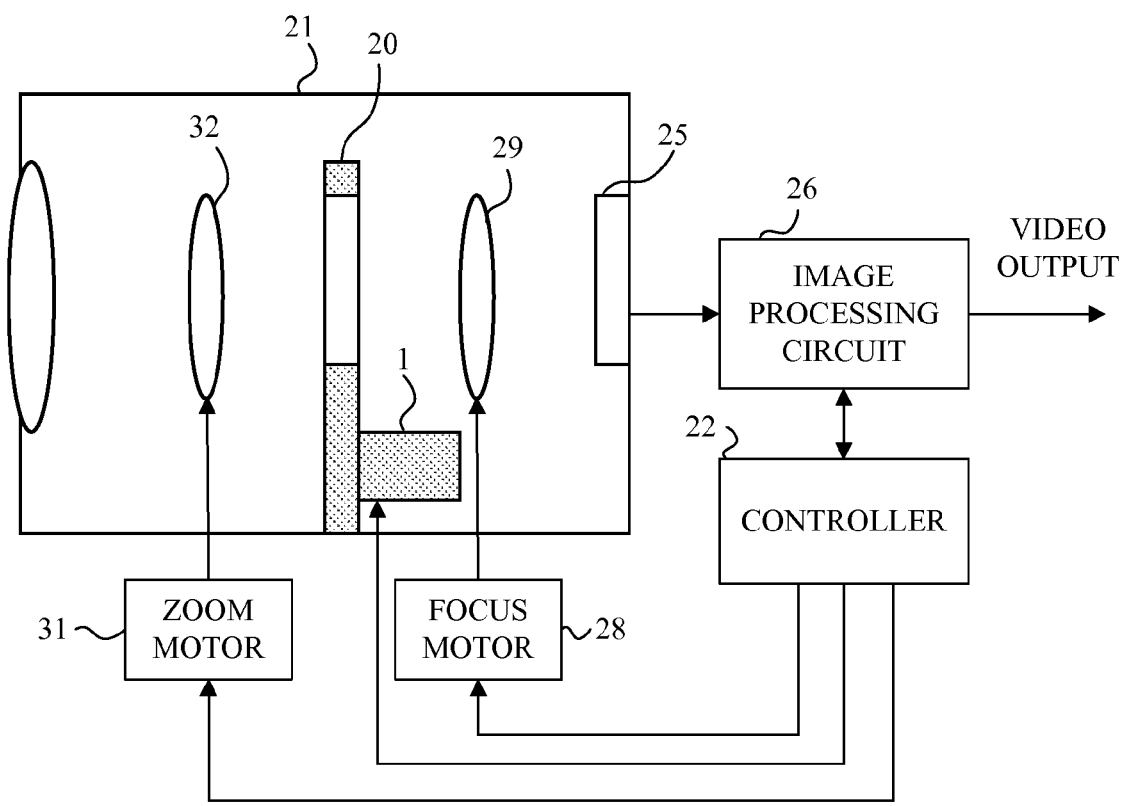
FIG. 23 shows an optical apparatus that is Embodiment 8 of the present invention, which includes the aperture stop apparatus of any one of Embodiments 1 to 7.

FIG. 23 shows a configuration of a video camera (image pickup apparatus) as an optical apparatus including the aperture stop apparatus described in any one of Embodiments 1 to 7.

A lens barrel portion 21 of the video camera houses thereinside an image taking optical system including a magnification-varying lens 32, the aperture stop apparatus 20 and a focus lens 29.

An image sensor 25 constituted by a photoelectric conversion element such as a CCD sensor or a CMOS sensor photoelectrically converts an object image formed by the image taking optical system to output an electric signal. Changing the aperture size of the aperture stop apparatus 20 or moving the ND filter so as to cover the aperture and retract therefrom can properly set luminance of the object image formed on the image sensor 25 (that is, quantity of light reaching the image sensor 25).

The electric signal output from the image sensor 25 is subjected to various image processes by an image processing circuit 26, and thereby an image signal (video output) is produced.

A controller 22 controls a zoom motor 31 in response to user's operations of a zoom switch (not shown) to move the magnification-varying lens 32 for variation of magnification (zooming). The controller 22 further detects contrast of the image signal, and controls a focus motor 28 according to the detected contrast to move the focus lens 29 for autofocus.

In addition, the controller 22 controls the aperture stop driver 1 (and the ND driver 17) based on luminance information of the image signal to control the light-quantity. The use of the aperture stop apparatus 20 makes it possible to form blur and ghost having a natural shape, which enables recording of high-quality image. Moreover, the aperture stop apparatus 20 housed in the lens barrel portion is compact, which enables miniaturization of the lens barrel portion and the entire video camera.

The light-quantity control apparatus of the embodiments corresponding to the first aspect of the present invention can provide a good aperture shape by combination of the first aperture blade movable in the direction orthogonal to the light passing direction and the second aperture blade rotatable in the surface orthogonal to the light passing direction. Furthermore, the light-quantity control apparatus of the embodiments corresponding to the first aspect uses the boss portion, which is provided in the base member for guiding the first aperture blade, also as a rotation center for the second aperture blade, thereby making it possible to increase the degree of freedom of the shape of the first and second aperture blades and shape of the base member and to facilitate miniaturization of the apparatus.

Moreover, the light-quantity control apparatus of the embodiments corresponding to the second aspect of the present invention can provide a good aperture shape by combination of the first aperture blade movable in the direction orthogonal to the light passing direction and the second aperture blade rotatable in the surface orthogonal to the light passing direction. Furthermore, the light-quantity control apparatus of the embodiments corresponding to the second aspect moves or rotates both the aperture blades through the same transmitting portion provided in the driving lever rotatable about a position away in the direction orthogonal to the light passing direction from the opening (aperture), which enables miniaturization of the entire apparatus, as compared with a configuration in which a member such as a driving ring is rotated around the aperture.

In addition, the light-quantity control apparatus of the embodiments corresponding to the third aspect of the present invention can provide a good aperture shape by combination of the first aperture blade movable in the direction orthogonal to the light passing direction and the second aperture blade rotatable in the surface orthogonal to the light passing direction. Furthermore, the light-quantity control apparatus of the embodiments corresponding to the third aspect has a configuration in which the first aperture blade is movable in the direction orthogonal to the light passing direction with rotation thereof about the transmitting portion, which enables miniaturization of the light-quantity control apparatus and an optical apparatus including this light-quantity control apparatus, as compared with a configuration in which the first aperture blade is movable in the direction orthogonal to the light passing direction without rotation thereof.

Moreover, a configuration where the aperture blades form a fully-opened aperture inside the opening of the base member eliminates a necessity of providing a fixed aperture member for deciding a reference aperture diameter, which can achieve further reduction in thickness of the light-quantity control apparatus and miniaturization thereof.

Furthermore, the present invention is not limited to these embodiments and various variations and modifications may be made without departing from the scope of the present invention.

What is claimed is:

1. A light-quantity control apparatus comprising:
   a base member provided with an opening allowing light to pass therethrough in a light passing direction;
   a first aperture blade linearly movable with respect to the base member in a direction orthogonal to the light passing direction so as to increase and decrease its part overlapping the opening;
   a second aperture blade rotatable with respect to the base member in a surface orthogonal to the light passing direction toward a center of the opening so as to increase and decrease its part overlapping the opening;
   a driver attached to the base member; and
   a driving lever having a rotation axis spaced, in the direction orthogonal to the light passing direction, from the opening to be rotated by the driver about the rotation axis to drive the first aperture blade and the second aperture blade,
   wherein the first aperture blade engages with a driving pin provided in the driving lever and receives a driving force from the driving pin,
   wherein the second aperture blade is provided with (a) a driving cam groove portion with which the driving pin engaging with the first aperture blade slidably engages and (b) a rotation center hole portion with which a protruding portion provided in the base member engages,
   wherein the second aperture blade is rotated about the protruding portion in the surface orthogonal to the light passing direction by sliding of the driving pin with respect to the driving cam groove portion with rotation of the driving lever,
   wherein the apparatus includes a plurality of the first aperture blades, a plurality of the second aperture blades, and a plurality of the driving pins, and
   wherein the first aperture blade and the driving cam groove portion of the second aperture blade engage with each of the driving pins.

2. A light-quantity control apparatus according to claim 1, wherein at least one of the first and second aperture blades forms, in a fully-opened aperture state, a fully-opened aperture whose diameter is smaller than that of the opening of the base member.

3. An optical apparatus comprising:
   a body of the apparatus; and
   a light-quantity control apparatus according to claim 1, which is housed in the body.

4. A light-quantity control apparatus according to claim 1, wherein the first aperture blade is linearly moved along a direction orthogonal to a width direction of the base member, the width direction of the base member being defined to be orthogonal to the light passing direction and orthogonal to a direction in which the first aperture blade moves, and wherein the first aperture blade is linearly movable in an orthogonal-optical-axis direction with swing and shift in the width direction of the base member.

5. A light-quantity control apparatus according to claim 1, wherein a position where the driving pin and the second aperture blade are engaged is provided at one end of a width direction of the base member, the width direction of the base member being defined to be orthogonal to the light passing direction and orthogonal to a direction in which the first aperture blade moves, and a position where the protruding portion and the first aperture blade are engaged is provided at the other end of the width direction of the base member as a rotation center of the second aperture blade.

6. A light-quantity control apparatus comprising:
a base member provided with an opening allowing light to pass therethrough in a light passing direction;
a first aperture blade linearly movable with respect to the base member in a direction orthogonal to the light passing direction so as to increase and decrease its part overlapping the opening;
a second aperture blade rotatable with respect to the base member in a surface orthogonal to the light passing direction toward a center of the opening so as to increase and decrease its part overlapping the opening;
a driver attached to the base member; and
a driving lever having a rotation axis spaced, in the direction orthogonal to the light passing direction, from the opening to be rotated by the driver about the rotation axis to drive the first aperture blade and the second aperture blade,
wherein the base member is provided with a protruding portion engaging with a groove portion provided in the first aperture blade to guide the first aperture blade in its movable direction,
wherein the second aperture blade is provided with (a) a driving cam groove portion with which a driving pin provided in the driving lever slidably engages and (b) a rotation center hole portion with which the protruding portion engages,
wherein the second aperture blade is rotated about the protruding portion in the surface orthogonal to the light passing direction by sliding of the driving pin with respect to the driving cam groove portion with rotation of the driving lever,
wherein the apparatus includes a plurality of the first aperture blades, a plurality of the second aperture blades, and a plurality of the driving pins, and
wherein the groove portions of the first aperture blades and the rotation center hole portions of the second aperture blades engage with each of the driving pins.

7. A light-quantity control apparatus according to claim 6, wherein the first aperture blade is moved by engagement with the driving pin engaging with the driving cam groove portion of the second aperture blade.

8. A light-quantity control apparatus according to claim 6, wherein the protruding portion and the driving pin are provided on one side with respect to the opening in the movable direction of the first aperture blade.

9. A light-quantity control apparatus according to claim 6, wherein at least one of the first and second aperture blades forms, in a fully-opened aperture state, a fully-opened aperture whose diameter is smaller than that of the opening of the base member.

10. A light-quantity control apparatus according to claim 6, wherein the first aperture blade is linearly moved along a direction orthogonal to a width direction of the base member, the width direction of the base member being defined to be orthogonal to the light passing direction and orthogonal to a direction in which the first aperture blade moves, and wherein the first aperture blade is linearly movable in an orthogonal-optical-axis direction with swing and shift in the width direction of the base member.

11. A light-quantity control apparatus according to claim 10, wherein at least one of the first and second aperture blades forms, in a fully-opened aperture state, a fully-opened aperture whose diameter is smaller than that of the opening of the base member.

12. An optical apparatus comprising:
a body of the apparatus; and
a light-quantity control apparatus according to claim 10, which is housed in the body.

13. An optical apparatus comprising:
a body of the apparatus; and
a light-quantity control apparatus according to claim 6, which is housed in the body.

14. A light-quality control apparatus comprising:
a base member provided with an opening allowing light to pass the therethrough in a light passing direction;
a first aperture blade linearly movable with respect to the base member in a direction orthogonal to the light passing direction so as to increase and decrease its part overlapping the opening;
a second aperture blade rotatable with respect to the base member in a surface orthogonal to the light passing direction toward a center of the opening so as to increase and decrease its part overlapping the opening;
a driver attached to the base member; and
a driving lever having a rotation axis spaced, the direction orthogonal to the light passing direction, from the opening to be rotated by the driver about the rotation axis to drive the first aperture blade and the second aperture blade,
wherein the first aperture blade engages with a driving pin provided in the driving lever and receives a driving force from the driving pin,
wherein the second aperture blade is provided with (a) a driving cam groove portion with which the driving pin engaging with the first aperture blade slidably engages and (b) a rotation center hole portion with which a protruding portion provided in the base member engages,
wherein the second aperture blade is rotated about the protruding portion in the surface orthogonal to the light passing direction by sliding of the driving pin with respect to the driving cam groove portion with rotation of the driving lever, and
wherein a position where the driving pin and the second aperture blade are engaged is provided at one end of a width direction of the base member being defined to be orthogonal to the light passing direction and orthogonal to a direction in which the first aperture blade moves, and a position where the protruding portion and the first aperture blade are engaged is provided at the other end of the width direction of the base member as a rotation center of the second aperture blade.

* * * * *